United States Patent
Sakata et al.

(10) Patent No.: US 12,509,110 B2
(45) Date of Patent: Dec. 30, 2025

(54) TRAFFIC CONTROL APPARATUS, TRAFFIC CONTROL SYSTEM, AND TRAFFIC CONTROL METHOD

(71) Applicant: NEC Corporation, Tokyo (JP)

(72) Inventors: Masayuki Sakata, Tokyo (JP); Takashi Yamane, Tokyo (JP); Takanori Iwai, Tokyo (JP); Yusuke Shinohara, Tokyo (JP); Kosei Kobayashi, Tokyo (JP); Koichi Nihei, Tokyo (JP)

(73) Assignee: NEC CORPORATION, Tokyo (JP)

( * ) Notice: Subject to any disclaimer, the term of this patent is extended or adjusted under 35 U.S.C. 154(b) by 216 days.

(21) Appl. No.: 17/909,551

(22) PCT Filed: Mar. 30, 2020

(86) PCT No.: PCT/JP2020/014427
§ 371 (c)(1),
(2) Date: Sep. 6, 2022

(87) PCT Pub. No.: WO2021/199099
PCT Pub. Date: Oct. 7, 2021

(65) Prior Publication Data
US 2023/0347927 A1 Nov. 2, 2023

(51) Int. Cl.
*B60W 60/00* (2020.01)
*G08G 1/127* (2006.01)

(52) U.S. Cl.
CPC ........ *B60W 60/001* (2020.02); *B60W 60/005* (2020.02); *G08G 1/127* (2013.01); *B60W 2556/50* (2020.02); *B60W 2756/10* (2020.02)

(58) Field of Classification Search
None
See application file for complete search history.

(56) References Cited

U.S. PATENT DOCUMENTS 8,849,494 B1 * 9/2014 Herbach .............. G05D 1/0044
701/24
2017/0300762 A1 10/2017 Ishii et al.
(Continued)

FOREIGN PATENT DOCUMENTS

JP 2017-194948 A 10/2017
JP 2018-140755 A 9/2018
(Continued)

OTHER PUBLICATIONS

International Search Report for PCT Application No. PCT/JP2020/014427, mailed on Jun. 30, 2020.

*Primary Examiner* — Jean Paul Cass
(74) *Attorney, Agent, or Firm* — Sughrue Mion, PLLC

(57) ABSTRACT

A traffic control apparatus includes state specifying means for specifying a state of a vehicle based on peripheral information about the vehicle received from the vehicle that can be autonomously driven, state comparison means for comparing a first specified vehicle state, which is a state of the vehicle specified by the state specifying means, with a second specified vehicle state, which is the state of the vehicle received from the vehicle and specified by the vehicle based on the peripheral information, to see whether there is a difference between the first specified vehicle state and the second specified vehicle state, and notification means for outputting a message indicating the difference when there is the difference between the first specified vehicle state and the second specified vehicle state.

16 Claims, 13 Drawing Sheets

(56) References Cited

U.S. PATENT DOCUMENTS

| | | | |
|---|---|---|---|
| 2019/0137999 A1 | 5/2019 | Taguchi et al. | |
| 2019/0317491 A1 | 10/2019 | Kobayashi et al. | |
| 2020/0342760 A1* | 10/2020 | Vassilovski | G08G 1/161 |
| 2021/0294944 A1* | 9/2021 | Nassar | G06F 30/27 |
| 2023/0356728 A1* | 11/2023 | Jain | G06F 3/013 |

FOREIGN PATENT DOCUMENTS

| | | | | |
|---|---|---|---|---|
| JP | 2018-142921 A | 9/2018 | | |
| JP | 2019-021201 A | 2/2019 | | |
| JP | 2019-023046 A | 2/2019 | | |
| JP | 2019-087015 A | 6/2019 | | |
| KR | 102652687 B1 * | 6/2023 | | |
| WO | WO-0016293 A1 * | 3/2000 | | G08G 1/20 |
| WO | 2016/080452 A1 | 5/2016 | | |
| WO | 2018/101247 A1 | 6/2018 | | |

\* cited by examiner

TRAFFIC CONTROL APPARATUS, TRAFFIC CONTROL SYSTEM, AND TRAFFIC CONTROL METHOD

This application is a National Stage Entry of PCT/JP2020/014427 filed on Mar. 30, 2020, the contents of all of which are incorporated herein by reference, in their entirety.

TECHNICAL FIELD

The present disclosure relates to a traffic control apparatus, a traffic control system, and a traffic control method.

BACKGROUND ART

In the Lv4 generation and above of autonomous driving vehicles, it is assumed that there is no driver inside the vehicles. Therefore, it is desirable to construct a so-called watching system in which a remote monitoring person is assigned to watch over the vehicle from a distance, so that any abnormality in the vehicle can be handled.

For example, Patent Literature 1 discloses a remote monitoring system composed of an autonomous traveling vehicle and a remote monitoring center. In the remote monitoring system of Patent Literature 1, when an obstacle detection unit of the autonomous driving vehicle detects an obstacle, a stop control unit stops the autonomous traveling vehicle and transmits a video image captured a camera to the remote monitoring center.

Patent Literature 2 and 3 describe a remote type autonomous driving system including a plurality of autonomous driving vehicles and a plurality of remote control apparatuses. In the remote type autonomous driving system described in Patent Literature 2 and 3, when a monitoring person requests a video image captured by a camera from the remote control apparatus, the autonomous driving vehicle transmits the video image of the camera to the remote control apparatus.

CITATION LIST

Patent Literature

Patent Literature 1: Japanese Unexamined Patent Application Publication No. 2019-087015
Patent Literature 2: Japanese Unexamined Patent Application Publication No. 2018-142921
Patent Literature 3: Japanese Unexamined Patent Application Publication No. 2018-140755

SUMMARY OF INVENTION

Technical Problem

In Patent Literature 1 to 3, an operator (a remote monitoring person) on the traffic control-side remotely controls a vehicle to be remotely controlled. The remote monitoring person needs to pay close attention to the vehicle in his/her charge. Therefore, in order to operate a plurality of autonomous driving vehicles, it is necessary to increase the number of remote monitoring persons. When a remote monitoring person is remotely operating an autonomous driving vehicle, the remote monitoring person is forced to interrupt the operation of other autonomous driving vehicles. That will disrupt operations of autonomous driving vehicles.

An object of the present disclosure is to provide a traffic control apparatus, a traffic control system, and a traffic control method that can facilitate an operation of an autonomous driving vehicle.

Solution to Problem

In an example aspect of the present disclosure, a traffic control apparatus includes: state specifying means for specifying a state of a vehicle based on peripheral information about the vehicle received from the vehicle that can be autonomously driven; state comparison means for comparing a first specified vehicle state with a second specified vehicle state to see whether there is a difference between the first specified vehicle state and the second specified vehicle state, the first specified vehicle state being a state of the vehicle specified by the state specifying means and the second specified vehicle state being the state of the vehicle received from the vehicle and specified by the vehicle based on the peripheral information; and notification means for outputting a message indicating the difference when there is the difference between the first specified vehicle state and the second specified vehicle state.

In another example aspect of the present disclosure, a traffic control system includes: a vehicle that can be autonomously driven; and a traffic control center configured to control the vehicle. The vehicle includes: a sensor configured to collect peripheral information about the vehicle; and vehicle control means for controlling autonomous driving of the vehicle based on the collected peripheral information and specifying a state of the vehicle. The traffic control center includes: state specifying means for specifying the state of the vehicle based on the peripheral information; state comparison means for comparing a first specified vehicle state with a second specified vehicle state to see whether there is a difference between the first specified vehicle state and the second specified vehicle state, the first specified vehicle state being the state of the vehicle specified by the state specifying means and the second specified vehicle state being the state of the vehicle specified by the vehicle control means; and notification means for outputting a message indicating the difference when there is the difference between the first specified vehicle state and the second specified vehicle state.

In another example aspect of the present disclosure, a traffic control method includes: receiving peripheral information about a vehicle from the vehicle that can be autonomously driven and a state of the vehicle specified by the vehicle based on the peripheral information; specifying a first specified vehicle state based on the received peripheral information, the first specified vehicle state being the state of the vehicle; comparing the specified first specified vehicle state with a second specified vehicle state to see whether there is a difference between the first specified vehicle state and the second specified vehicle state, the second specified vehicle state being the state of the vehicle specified by the vehicle; and outputting a message indicating the difference when there is the difference between the first specified vehicle state and the second specified vehicle state.

Advantageous Effects of Invention

According to the present disclosure, it is possible to provide a vehicle traffic control apparatus, a vehicle traffic control system, and a vehicle traffic control method that can facilitate the operation of an autonomous driving vehicle.

EXAMPLE EMBODIMENT

Example embodiments will be described below with reference to the drawings. For clarity of explanation, the following description and drawings have been omitted and simplified as appropriate. In each of the drawings, the same elements are denoted by the same reference signs, and repeated explanations are omitted if necessary.

First Example Embodiment

<Traffic Control System>

Figure 1:
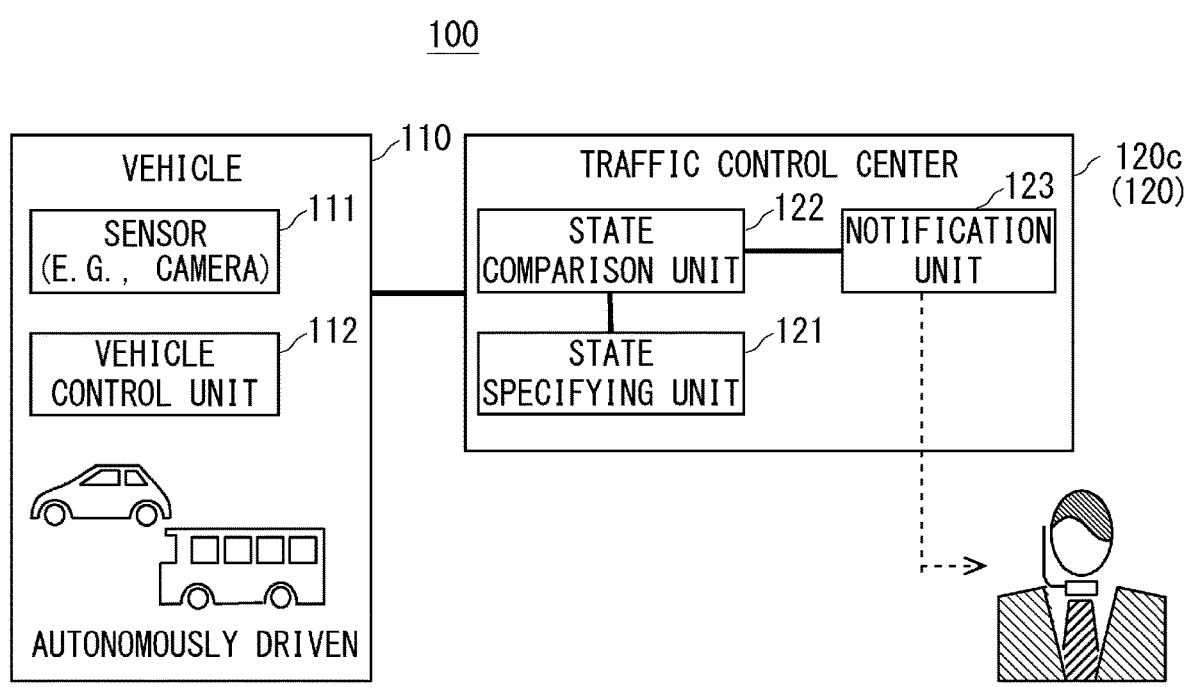
FIG. 1 is a configuration diagram showing an example of a traffic control system according to a first example embodiment.

First, a traffic control system according to the first example embodiment will be described. FIG. 1 is a configuration diagram showing an example of a traffic control system according to the first example embodiment. As shown in FIG. 1, a traffic control system 100 includes a vehicle 110 and a traffic control center 120c.

The traffic control system 100 is a system for controlling the vehicle 110 having an autonomous driving function. In the traffic control system 100 according to this example embodiment, the traffic control center 120c receives, from the vehicle 110, information about periphery of the vehicle 110 (hereinafter referred to as peripheral information) and a state of the vehicle 110 specified by the vehicle 110. The traffic control center 120c specifies the state of the vehicle 110 based on the received peripheral information about the vehicle 110, and compares the specified state of the vehicle 110 and the state of the vehicle 110 specified by the vehicle 110 to see if there is any difference between them. When there is a difference between them, the peripheral information is output to the remote monitoring person. The state of the vehicle 110 specified by the vehicle 110 may be referred to as a vehicle-side specified vehicle state or a second specified vehicle state. The state of the vehicle 110 specified by the control center 120c may be referred to as a traffic control-side specified vehicle state or a first specified vehicle state.

A traffic control apparatus 120 is provided in the traffic control center 120c. The vehicle 110 and the traffic control apparatus 120 constituting the traffic control system 100 will be described below.

<Vehicle>

The vehicle 110 has an autonomous driving function that enables the vehicle 110 to be autonomously driven. The vehicle 110 having the autonomous driving function is, for example, an autonomous driving vehicle such as a private car, a taxi, a bus, or a truck. The vehicle 110 having the autonomous driving function is not limited to an autonomous driving vehicle traveling on a road, and may instead be a train or the like traveling on a railway. The vehicle 110 includes a sensor 111 and a vehicle control unit 112.

The sensor 111 collects the peripheral information about the vehicle 110. The sensor 111 may be, for example, a camera, a speedometer, a rudder angle indicator, a GPS (Global Positioning System) receiver, or the like. The camera captures an image of an area in front of, around, or inside the vehicle 110. The speedometer measures a speed of the vehicle 110. The rudder angle indicator detects a course direction of the vehicle 110. The GPS receiver detects the position of the vehicle 110. The sensor 111 is not limited to a camera, a speedometer, a rudder angle indicator, a GPS receiver, etc., as long as it collects the peripheral information about the vehicle 110.

The sensor 111 outputs the collected peripheral information about the vehicle 110 to the vehicle control unit 112. The sensor 111 transmits the collected peripheral information about the vehicle 110 to the traffic control center 120c. The collected peripheral information about the vehicle 110 includes, for example, video information about the area in front of the vehicle 110, video information about the inside of the vehicle, and sensor information such as a speed, a course direction, and a position.

The vehicle control unit 112 controls the vehicle 110 based on the collected peripheral information about the vehicle 110. Therefore, the vehicle control unit 112 functions as vehicle control means. For example, the vehicle control unit 112 controls the vehicle 110 to stop based on video information about an obstacle on the road from the camera. The vehicle control unit 112 controls the vehicle to increase the speed based on video information about a highway sign obtained from the camera.

The vehicle control unit 112 may be connected to an ECU (Electronic Control Unit) and control the ECU in order to control the vehicle 110. The vehicle control unit 112 may be composed of hardware including a microcomputer having a CPU (Central Processing Unit), a ROM (Read Only Memory), a RAM (Random Access Memory), an interface (I/F), and the like. The CPU performs control processing, and the like based on the peripheral information about the vehicle 110. The ROM stores, a control program and the like executed by the CPU. The RAM stores various data pieces such as the peripheral information about the vehicle 110. The interface unit (I/F) inputs and outputs signals to and from an external device such as a network. The CPU, the ROM, the RAM, and the interface are connected to each other via data buses or the like.

The vehicle control unit 112 specifies the state of the vehicle 110 (the vehicle-side specified vehicle state) based on the peripheral information collected by the sensor 111. For example, the vehicle control unit 112 specifies that the vehicle 110 is stopped in front of an obstacle on the road based on the video information about the obstacle on the road and the peripheral information of the speed 0 from the speedometer [km/h].

For example, the vehicle control unit 112 specifies that the vehicle 110 is stopped in front of a stop sign based on the video information about the stop sign from the camera and the peripheral information of the speed 0 from the speedometer [km/h].

For example, the vehicle control unit 112 specifies that the vehicle 110 is in a state stopped in front of another stopped vehicle based on the video information about the other stopped vehicle from the camera and the peripheral information of the speed 0 [km/h] from the speedometer.

The vehicle control unit 112 transmits the specified state of the vehicle 110 (the vehicle-side specified vehicle state) to the traffic control center 120c. For example, the state of the vehicle 110 "stopped in front of an obstacle on the road", the state of the vehicle 110 "stopped in front of a stop sign", and the state "stopped in front of another stopped vehicle" are transmitted to the traffic control center 120c.

<Traffic Control Apparatus>

Figure 2:
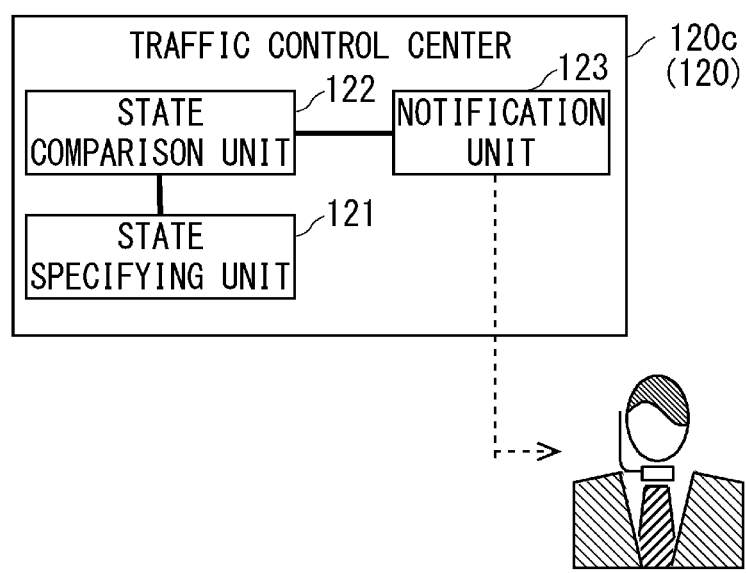
FIG. 2 is a configuration diagram showing an example of the traffic control apparatus according to the first example embodiment.

FIG. 2 is a configuration diagram showing an example of the traffic control apparatus 120 according to the first example embodiment. As shown in FIG. 2, the traffic control center 120c includes a traffic control apparatus 120. The traffic control apparatus 120 is a stand-alone device, and may be incorporated into the traffic control system 100 as shown in FIG. 1.

The traffic control apparatus 120 may be composed of hardware including a microcomputer having a CPU, a RAM, an interface unit (I/F), and the like. The CPU performs analysis processing, control processing, and the like based on the peripheral information about the vehicle 110. The ROM stores an analysis program, a control program and the like executed by the CPU. The RAM stores various data pieces such as the peripheral information about the vehicle 110. The interface unit (I/F) inputs and outputs signals to and from an external device such as a network NW. The CPU, the ROM, the RAM, and the interface are connected to each other via data buses or the like.

As shown in FIGS. 1 and 2, the traffic control apparatus 120 includes a state specifying unit 121, a state comparison unit 122, and a notification unit 123. The state specifying unit 121, the state comparison unit 122, and the notification unit 123 have functions of specifying means for specifying the state of the vehicle 110, comparison means for comparing the states of the vehicle 110, and notification means for notifying peripheral information, respectively.

The state specifying unit 121 specifies the state (the traffic control-side specified vehicle state) of the vehicle 110 based on the peripheral information received from the vehicle 110. In some cases, the state specifying ability of the state specifying unit 121 of the traffic control apparatus 120 based on the peripheral information may be superior to that of the vehicle control unit 112 of the vehicle 110. Therefore, if the vehicle-side specified vehicle state specified by the vehicle control unit 112 is correct, the state specifying unit 121 specifies the same state as the vehicle-side specified vehicle state.

For example, the state specifying unit 121 specifies the state of the vehicle 110 "stopped in front of an obstacle on the road" based on the video information about an obstacle on the road and the peripheral information of the speed 0 from the speedometer [km/h].

The state specifying unit 121 specifies the state of the vehicle 110 "stopped in front of a stop sign" based on the video information about a stop sign from the camera and the peripheral information of the speed 0 from the speedometer [km/h].

The state specifying unit 121 specifies that the vehicle 110 is in a state stopped in front of another stopped vehicle based on the video information about the other stopped vehicle from the camera and the peripheral information of the speed 0 from the speedometer [km/h].

On the other hand, the vehicle-side specified vehicle state specified by the vehicle control unit 112 in the vehicle 110 may include false recognition, errors, etc.

For example, even when the vehicle control unit 112 has specified the state as "stopped in front of an obstacle on the road", the obstacle may actually be paper waste on the road. In this case, the state specifying unit 121, which has the excellent state specifying ability, may determine that the obstacle on the road is paper waste and specify that the vehicle 110 is in the state "stopped in front of paper waste on the road."

Alternatively, even when the vehicle control unit 112 has specified the state as "stopped in front of a stop sign", the stop sign may actually be a poster that says "STOP". In this case, the state specifying unit 121, which has the excellent state specifying ability, may determine that the stop sign is a poster and specify that the vehicle 110 is in the state "stopped in front of a poster that says STOP".

Further alternatively, even when the vehicle control unit 112 has specified that the vehicle has stopped in front of another stopped vehicle, the stopped vehicle may actually be a vehicle parked on the street. In this case, the state specifying unit 121, which has the excellent state specifying ability, may determine that the vehicle stopped is a vehicle parked on the street and specify that the vehicle 110 is in the state "stopped in front of a vehicle parked on the street". The state specifying unit 121 outputs the specified state of the vehicle 110 (the traffic control-side specified vehicle state) to the state comparison unit 122.

The state comparison unit 122 receives the state of the vehicle 110 specified by the state specifying unit 121 (the traffic control-side specified vehicle state) from the state specifying unit 121. The state comparison unit 122 receives the state of the vehicle 110 (the vehicle-side specified vehicle state) specified by the vehicle 110 from the vehicle 110. The state comparison unit 122 compares the specified state of the vehicle 110 specified by the state specifying unit 121 (the traffic control-side specified vehicle state) with the state of the vehicle 110 specified by the vehicle 110 (the vehicle-side specified vehicle state) to see if there is any difference between them.

For example, if there is no difference between the state "stopped in front of an obstacle on the road" specified by the state specifying unit 121 and the state "stopped in front of an obstacle on the road" specified by the vehicle 110, the state comparison unit 122 outputs a result of the comparison indicating that there is no difference between them to the notification unit 123.

When there is no difference between the state "stopped in front of a stop sign" specified by the state specifying unit 121 and the state "stopped in front of a stop sign" specified by the vehicle 110, the state comparison unit 122 outputs a result of the comparison indicating that there is no difference between them to the notification unit 123.

When there is no difference between the state "stopped in front of another stopped vehicle" specified by the state specifying unit 121 and the state "stopped in front of another stopped vehicle" specified by the vehicle 110, the state comparison unit 122 outputs a result of the comparison indicating that there is no difference between them to the notification unit 123.

On the other hand, when there is a difference between the state "stopped in front of paper waste on the road" specified by the state specifying unit 121 and the state "stopped in front of an obstacle on the road" specified by the vehicle 110, the state comparison unit 122 outputs a result of the comparison indicating that there is a difference between them to the notification unit 123. In this case, the difference is due to the fact that the state of the vehicle specified by the state specifying unit 121 is a travelable state and the state of the vehicle specified by the vehicle 110 is an untravelable state.

When there is a difference between the state "stopped in front of a poster that says STOP" specified by the state specifying unit 121 and the state "stopped in front of a STOP sign" specified by the vehicle 110, the state comparison unit 122 outputs a result of the comparison indicating that there is a difference between them to the notification unit 123. In this case as well, the difference is due to the fact that the state of the vehicle specified by the state specifying unit 121 is in the travelable state and the state of the vehicle specified by the vehicle 110 is in the untravelable state.

When there is a difference between the state "stopped in front of a vehicle parked on the street" specified by the state specifying unit 121 and the state "stopped in front of another stopped vehicle" specified by the vehicle 110, the state comparison unit 122 outputs a result of the comparison indicating that there is a difference between them to the notification unit 123. In this case as well, the difference is due to the fact that the state of the vehicle specified by the state specifying unit 121 is in the travelable state and the state of the vehicle specified by the vehicle 110 is in the untravelable state. Note that the difference may be due to a case where the state of the vehicle specified by the state specifying unit 121 is the untravelable state and the state of the vehicle specified by the vehicle 110 is the travelable state.

As described above, the difference between the states of the vehicle 110 may be such that one of the state of the vehicle 110 specified by the state specifying unit 121 and the state of the vehicle 110 specified by the vehicle 110 is the travelable state and the other one of the state of the vehicle 110 specified by the state specifying unit 121 and the state of the vehicle 110 specified by the vehicle 110 is the untravelable state.

The notification unit 123 receives the result of the comparison from the state comparison unit 122. When there is a difference between the state of the vehicle 110 specified by the state specifying unit 121 (the traffic control-side specified vehicle state) and the state of the vehicle 110 specified by the vehicle 110 (the vehicle-side specified vehicle state) in the result of the comparison, the notification unit 123 outputs a message indicating the difference. For example, the notification unit 123 notifies the monitoring person of a message indicating the difference between them. If there is a difference between them, the message may include the peripheral information.

For example, the notification unit 123 notifies the monitoring person of the video information about an obstacle on the road (the video information may be about paper waste on the road) and the peripheral information of the speed 0 [km/h] from the speedometer. The notification unit 123 notifies the monitoring person of the video information of the stop sign (the video information may be about a poster that says STOP) and the peripheral information of the speed 0 [km/h] from the speedometer. Further, the notification unit 123 notifies the monitoring person of the video information about another stopped vehicle (the video may actually be video information about a vehicle parked on the street) and the peripheral information of the speed 0 from the speedometer [km/h].

The monitoring person receives the message indicating the difference. The monitoring person determines the state of the vehicle 110 based on the peripheral information. For example, the monitoring person determines whether the vehicle control unit 112 of the vehicle 110 or the state specifying unit 121 of the traffic control apparatus 120 is false recognition, or whether a failure is occurring in either of them. Then, the monitoring person performs actions such as restarting the vehicle 110 or the traffic control apparatus 120, remotely controlling the vehicle 110, or the like.

Next, a traffic control method will be described as an operation of the traffic control system 100 according to the first example embodiment. The description of the traffic control method will be divided into three parts; a description of an operation of the vehicle 110, a description of a traffic control method of the traffic control apparatus 120, and a description of a traffic control method of the traffic control system 100.

<Vehicle Operation>

Figure 3:
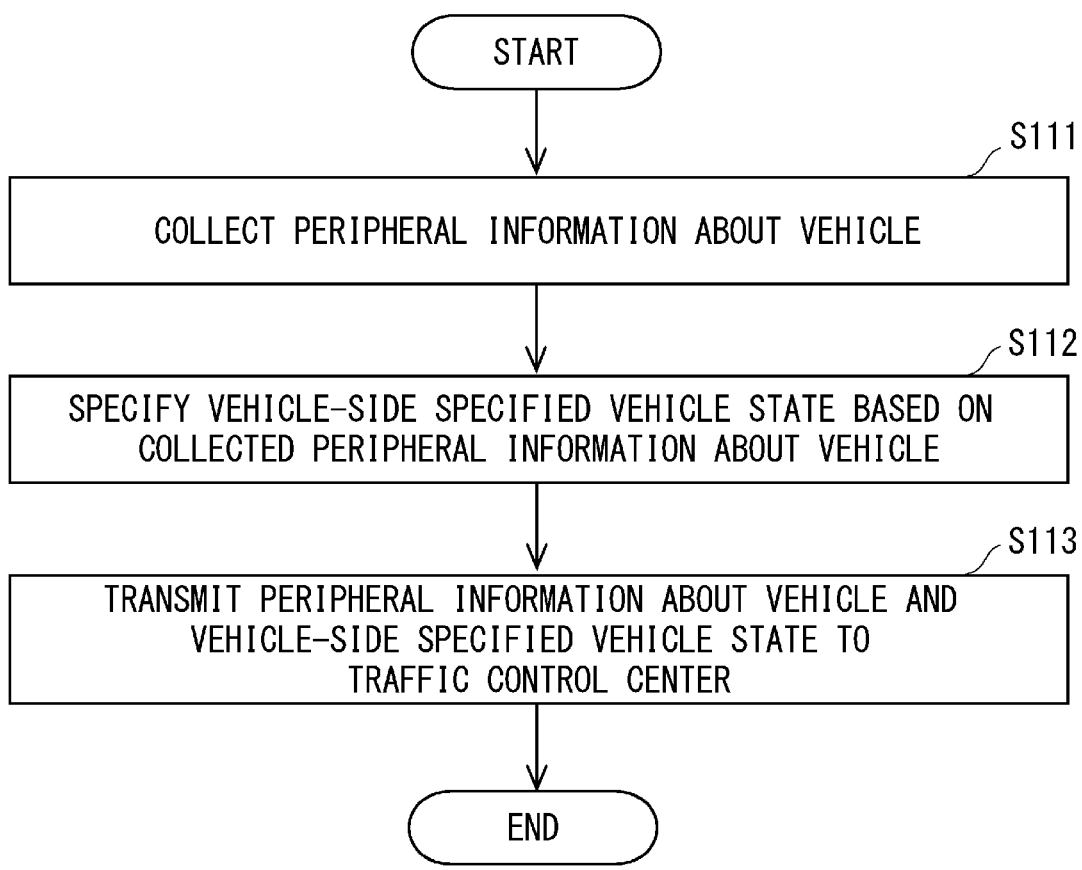
FIG. 3 is a flowchart showing an example of an operation of a vehicle according to the first example embodiment.

FIG. 3 is a flowchart showing an example of the operation of the vehicle 110 according to the first example embodiment. As shown in Step S111 of FIG. 3, peripheral information about the vehicle 110 is collected. For example, the sensor 111 collects peripheral information about the vehicle 110 that can be autonomously driven. The peripheral information about the vehicle 110 includes, for example, video information about the area in front of the vehicle 110, video information about the inside of the vehicle, speed, course direction, and position. The sensor 111 outputs the collected peripheral information to the vehicle control unit 112.

Next, as shown in Step S112, the state of the vehicle 110 (the vehicle-side specified vehicle state) is specified based on the collected peripheral information. Specifically, the vehicle control unit 112 controls the autonomous driving of the vehicle 110 based on the peripheral information output from the sensor 111, and specifies the state of the vehicle 110. For example, the vehicle control unit 112 determines that the vehicle 110 is in the state "stopped in front of an obstacle on the road", the state "stopped in front of a stop sign", or the state "stopped in front of another stopped vehicle".

Next, as shown in Step S113, the collected peripheral information about the vehicle 110 and the specified state of the vehicle 110 (the vehicle-side specified vehicle state) are transmitted to the traffic control center 120c. For example, the sensor 111 transmits the video information about an area in front of the vehicle 110 to the traffic control apparatus 120 as the collected peripheral information about the vehicle 110. The vehicle control unit 112 transmits, to the traffic control apparatus 120, the state "stopped in front of an obstacle on the road", the state "stopped in front of a stop sign", and the state "stopped in front of another stopped vehicle" as the state of the specified vehicle 110. The collected peripheral information and the specified state of the vehicle 110 may be collectively transmitted to the traffic control center 120c by the vehicle control unit 112. The collected peripheral information and the specified state of the vehicle 110 may be transmitted to the traffic control center 120*c* via the network.

<Traffic Control Method of Traffic Control Apparatus>

Figure 4:
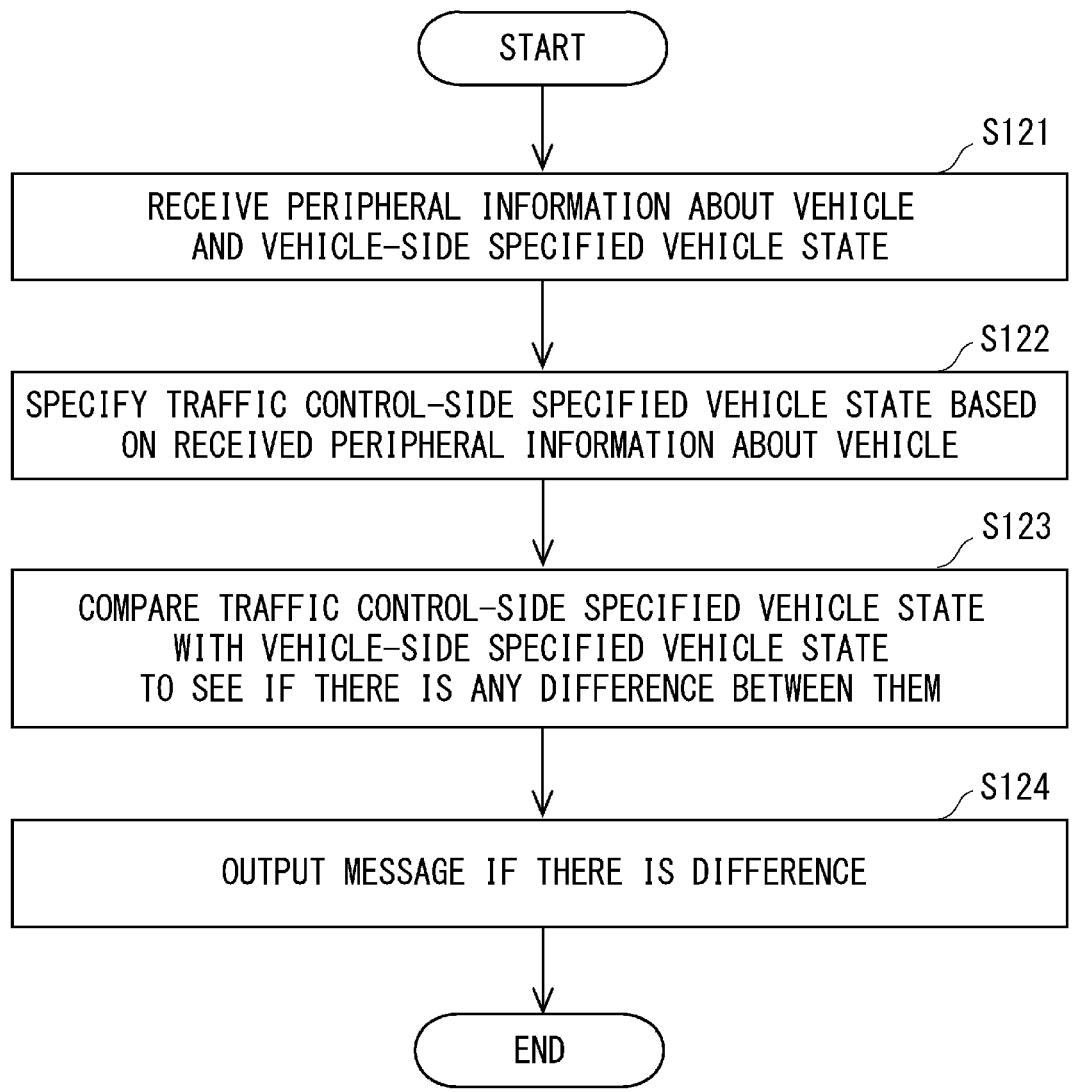
FIG. 4 is a flowchart showing an example of a traffic control method of the traffic control apparatus according to the first example embodiment.

Next, the traffic control method of the traffic control apparatus 120 will be described. FIG. 4 is a flowchart showing an example of the traffic control method of the traffic control apparatus 120 according to the first example embodiment. As shown in Step S121 in FIG. 4, the peripheral information about the vehicle 110 and the state of the vehicle 110 specified by the vehicle 110 (the vehicle-side specified vehicle state) are received from the vehicle 110. For example, the state specifying unit 121 receives the video information about the area in front of the vehicle 110 as the peripheral information about the vehicle 110 collected by the vehicle 110. In addition, the state comparison unit 122 receives, as the state of the vehicle 110 specified by the vehicle 110, the state "stopped in front of an obstacle on the road", the state "stopped in front of a stop sign", or the state "stopped in front of another stopped vehicle". The state specifying unit 121 and the state comparison unit 122 may receive the peripheral information about the vehicle 110 and the state of the vehicle 110 specified by the vehicle 110 via the network.

Next, as shown in Step S122, the state of the vehicle 110 (the traffic control-side specified vehicle state) is specified based on the received peripheral information about the vehicle 110. For example, if the state of the vehicle 110 (the vehicle-side specified vehicle state) specified by the vehicle control unit 112 is correct, the state specifying unit 121 specifies the same state as the vehicle-side specified vehicle state. For example, the state specifying unit 121 specifies that the vehicle 110 is in the state "stopped in front of an obstacle on the road", the state "stopped in front of a stop sign", or the state "stopped in front of another stopped vehicle" based on the received video information about the area in front of the vehicle 110.

On the other hand, the vehicle-side specified vehicle state specified by the vehicle control unit 112 in the vehicle 110 may include false recognition, errors, etc. In this case, the state specifying unit 121 of the traffic control apparatus 120, which has the excellent state specifying ability, correctly specifies the state of the vehicle 110, and specifies the state "stopped in front of paper waste on the road", the state "stopped in front of a poster that says STOP", or the state "stopped in front of a vehicle parked on the street".

Next, as shown in Step S123, the specified state of the vehicle 110 (the traffic control-side specified vehicle state) is compared with the state of the vehicle 110 specified by the vehicle 110 (the vehicle-side specified vehicle state) to see if there is any difference between them. For example, the state comparison unit 122 receives the state of the vehicle 110 specified by the state specifying unit 121 (the traffic control-side specified vehicle state) from the state specifying unit 121. Then, the state comparison unit 122 compares the traffic control-side specified vehicle state with the vehicle-side specified vehicle state to see if there is a difference between them.

For example, the state comparison unit 122 compares the state "stopped in front of an obstacle on the road", the state "stopped in front of a stop sign", or the state "stopped in front of another stopped vehicle" specified by the state specifying unit 121 with the state "stopped in front of an obstacle on the road", the state "stopped in front of a stop sign", or the state "stopped in front of another stopped vehicle", specified by the vehicle 110 respectively.

Alternatively, the state comparison unit 122 compares the state "stopped in front of paper waste on the road", the state "stopped in front of a poster that says STOP", or the state "stopped in front of a vehicle parked on the street" specified by the state specifying unit 121 with the state "stopped in front of an obstacle on the road", the state "stopped in front of a STOP sign", or the state "stopped in front of another stopped vehicle" specified by the vehicle 110, respectively. The state comparison unit 122 outputs the result of the comparison to the notification unit 123.

Next, as shown in Step S124, when there is a difference between the state specified by the state specifying unit 121 and the state of the vehicle 110 specified by the vehicle 110, a message indicating the difference is output. For example, when there is no difference between the state of the vehicle 110 specified by the state specifying unit 121 and the state of the vehicle 110 specified by the vehicle 110 in the result of the comparison received from the state comparison unit 122, the notification unit 123 causes the vehicle 110 to continue the autonomous driving. On the other hand, when there is a difference between them, the notification unit 123 outputs the peripheral information to the monitoring person. This enables the monitoring person to take measures such as restarting or remotely controlling the vehicle 110.

<Traffic Control Method of Traffic Control System>

Figure 5:
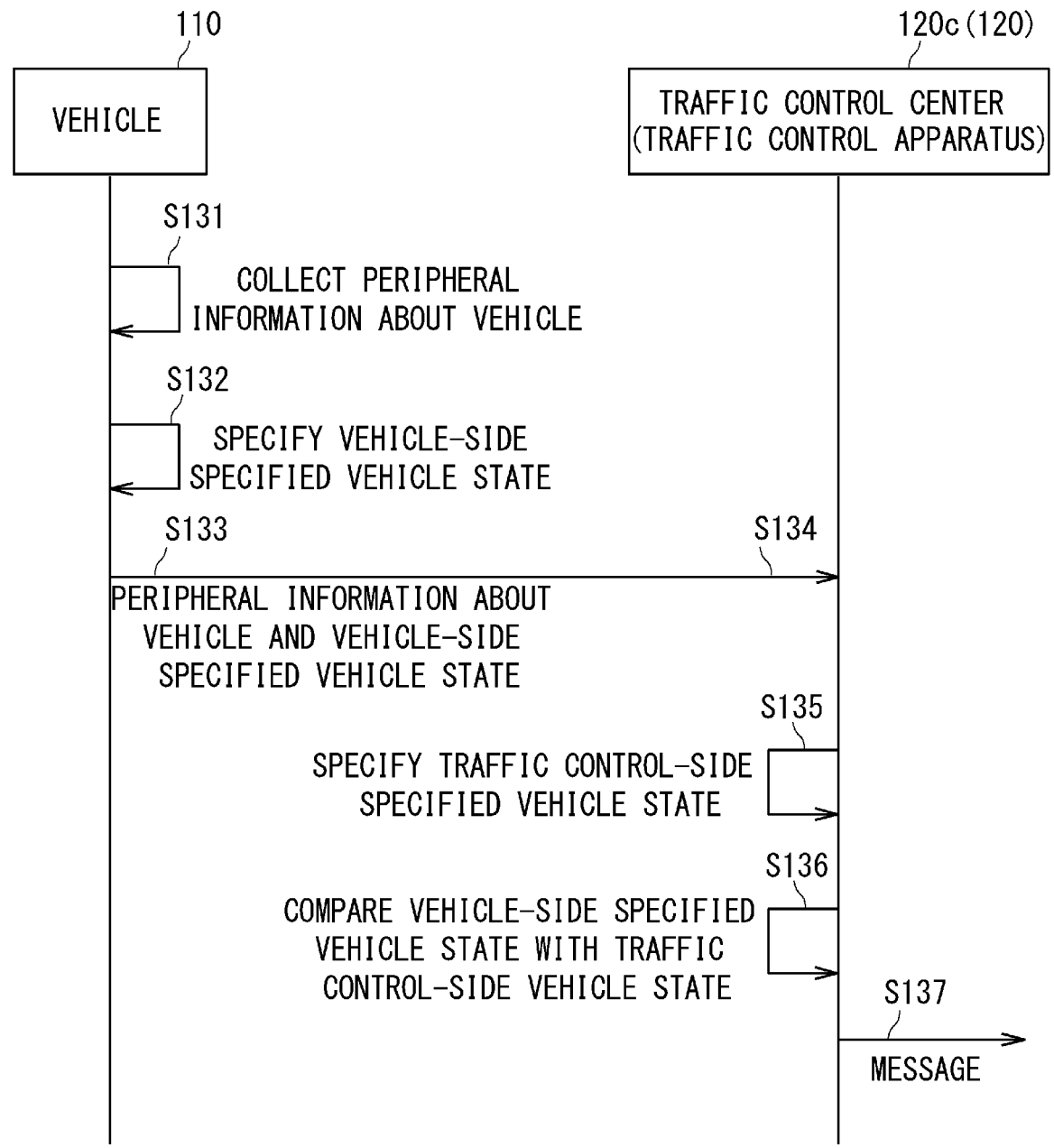
FIG. 5 is a sequence diagram showing an example of the traffic control method of the traffic control system according to the first example embodiment.

Next, the traffic control method of the traffic control system 100 will be described. FIG. 5 is a sequence diagram showing an example of the traffic control method of the traffic control system 100 according to the first example embodiment. As shown in Step S131 of FIG. 5, the vehicle 110 collects the peripheral information about the vehicle 110. For example, the sensor 111 collects the video information about the area in front of the vehicle 110, the video information about the inside of the vehicle, and the peripheral information such as speed, route direction, and position. The sensor 111 outputs the collected peripheral information to the vehicle control unit 112.

Next, as shown in Step S132, the vehicle 110 specifies the state of the vehicle 110 (the vehicle-side specified vehicle state) based on the collected peripheral information. For example, the vehicle control unit 112 controls the autonomous driving of the vehicle 110 based on the video information about the area in front of the vehicle 110 output from the sensor 111, and specifies that the vehicle 110 is in the state "stopped in front of an obstacle on the road", "stopped in front of a stop sign", or "stopped in front of another stopped vehicle".

Next, as shown in Step S133, the vehicle 110 transmits the collected peripheral information about the vehicle 110 and the specified state of the vehicle 110 (the vehicle-side specified vehicle state) to the traffic control center 120*c*. For example, the sensor 111 transmits the collected peripheral information about the vehicle 110 to the traffic control apparatus 120. The vehicle control unit 112 transmits the specified state of the vehicle 110 (the vehicle-side specified vehicle state) to the traffic control apparatus 120. The collected peripheral information and the specified state of the vehicle 110 may be collectively transmitted to the traffic control center 120*c* by the vehicle control unit 112.

Next, as shown in Step S134, the traffic control apparatus 120 receives the peripheral information about the vehicle 110 and the state of the vehicle 110 specified by the vehicle 110 (the vehicle-side specified vehicle state). For example, the state specifying unit 121 in the traffic control apparatus 120 receives the video information about the area in front of the vehicle 110 collected by the vehicle 110. In addition, the state comparison unit 122 receives the state "stopped in front of an obstacle on the road", the state "stopped in front of a stop sign", and the state "stopped in front of another stopped vehicle" as the state of the vehicle 110 (the vehicle-side specified vehicle state) specified by the vehicle 110. The state specifying unit 121 and the state comparison unit 122 may receive the peripheral information about the vehicle 110 and the state of the vehicle 110 specified by the vehicle 110 via the network.

Next, as shown in Step S135, the traffic control apparatus 120 specifies the state of the vehicle 110 (the traffic control-side specified vehicle state) based on the received peripheral information about the vehicle 110. For example, if the state of the vehicle 110 (the vehicle-side specified vehicle state) specified by the vehicle control unit 112 is correct, the state specifying unit 121 specifies the same state as the vehicle-side specified vehicle state. For example, the state specifying unit 121 specifies that the vehicle 110 is in the state "stopped in front of an obstacle on the road", the state "stopped in front of a stop sign", or the state "stopped in front of another stopped vehicle" based on the received video information about the area in front of the vehicle 110.

On the other hand, the vehicle-side specified vehicle state specified by the vehicle control unit 112 may include false recognition, errors, etc. In this case, the state specifying unit 121 of the traffic control apparatus 120, which has the excellent state specifying ability, correctly specifies the state of the vehicle 110, and specifies the state "stopped in front of paper waste on the road", the state "stopped in front of a poster that says STOP", or the state "stopped in front of a vehicle parked on the street".

Next, as shown in Step S136, the traffic control apparatus 120 compares whether there is a difference between the specified state of the vehicle 110 (the traffic control-side specified vehicle state) and the state of the vehicle 110 specified by the vehicle 110 (the vehicle-side specified vehicle state). For example, the state comparison unit 122 compares the state "stopped in front of an obstacle on the road", the state "stopped in front of a stop sign", or the state "stopped in front of another stopped vehicle" specified by the state specifying unit 121 with the state "stopped in front of an obstacle on the road", the state "stopped in front of a stop sign", or the state "stopped in front of another stopped vehicle" specified by the vehicle 110, respectively.

Alternatively, the state comparison unit 122 compares the state "stopped in front of paper waste on the road", the state "stopped in front of a poster that says STOP", or the state "stopped in front of a vehicle parked on the street" specified by the state specifying unit 121 with the state "stopped in front of an obstacle on the road", the state "stopped in front of a STOP sign", or the state "stopped in front of another stopped vehicle" specified by the vehicle 110, respectively, to see if there is any difference between them. The state comparison unit 122 outputs the result of the comparison to the notification unit 123.

Next, as shown in Step S137, when there is a difference, a message indicating the difference is output. For example, when there is a difference between the state of the vehicle 110 specified by the state specifying unit 121 and the state of the vehicle 110 specified by the vehicle 110 in the result of the comparison received from the state comparison unit 122, the notification unit 123 outputs a message indicating the difference to the monitoring person. This enables the monitoring person to take measures such as restarting or remotely controlling the vehicle 110. The message may include the peripheral information.

Next, the effect of this example embodiment will be described. In the traffic control apparatus 120 according to this example embodiment, the state comparison unit 122 compares whether there is a difference between the state of the specified vehicle 110 specified by the state specifying unit 121 (the traffic control-side specified vehicle state) and the state of the vehicle 110 specified by the vehicle 110 (the vehicle-side specified vehicle state). When there is a difference between them, the notification unit 123 outputs a message notifying the monitoring person of the difference. Therefore, the vehicle 110 can be restarted or remotely controlled when there is a difference due to a problem with the vehicle 110. This facilitates the operation of the autonomous driving vehicle.

In this example embodiment, the monitoring person is notified only when there is a difference between the states of the vehicle 110. Therefore, if there is no difference between the states of the vehicle 110, and the vehicle 110 can be autonomously driven, the monitoring person is not required. This can reduce the number of monitoring persons. Further, since the monitoring person can pay close attention to the vehicle 110 having a problem, the operation of the autonomous driving vehicle can be suppressed from being delayed.

In addition to the peripheral information received from the vehicle 110, the state specifying unit 121 may specify the traffic control-side specified vehicle state of the vehicle 110 based on information received from a fixed camera installed on a traffic light, a street, or the like, or an on-vehicle camera installed in another vehicle. This achieves further improvement of the accuracy of specifying the traffic control-side specified vehicle state.

Second Example Embodiment

Figure 6:
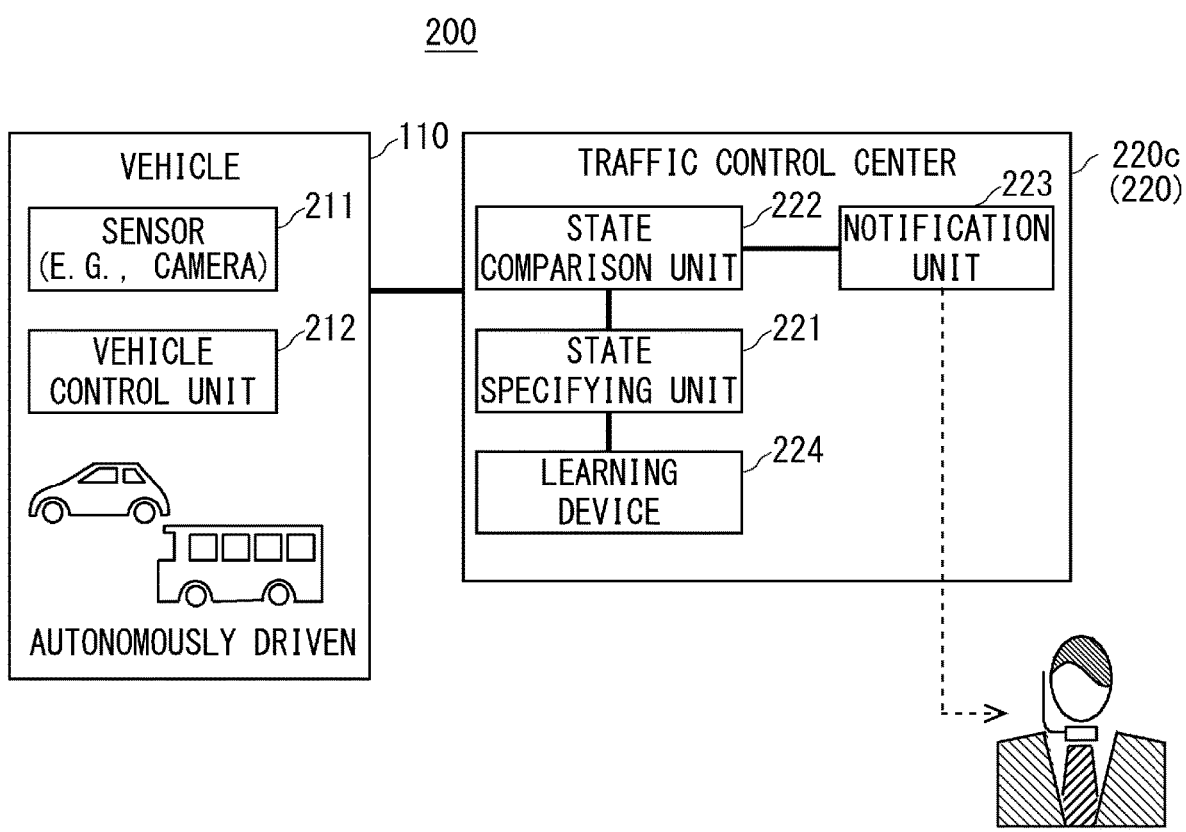
FIG. 6 is a configuration diagram showing an example of a traffic control system according to a second example embodiment.
Figure 7:
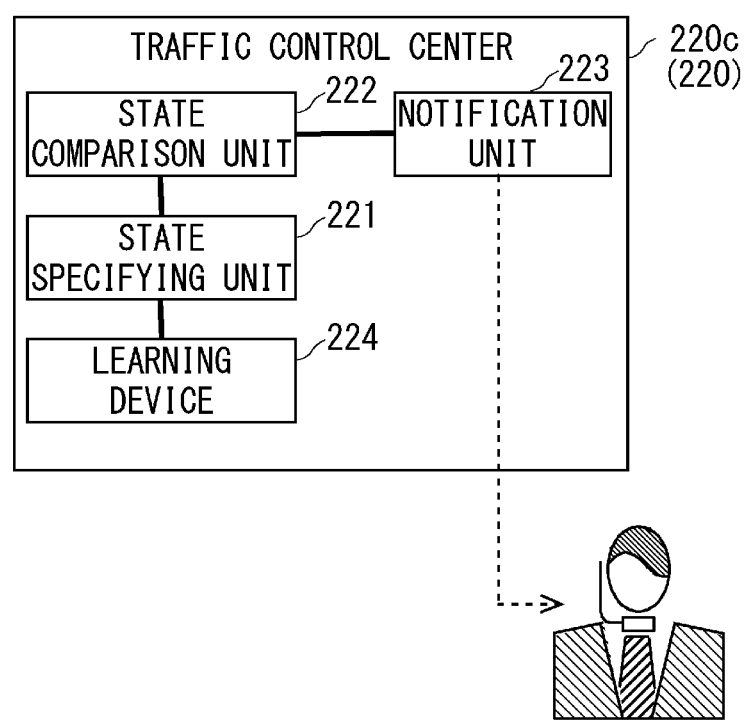
FIG. 7 is a configuration diagram showing an example of the traffic control apparatus according to the second example embodiment.

Next, a traffic control system according to a second example embodiment will be described. In a traffic control system according to this example embodiment, a traffic control apparatus includes a learning device. FIG. 6 is a configuration diagram showing an example of the traffic control system according to the second example embodiment. FIG. 7 is a configuration diagram showing an example of the traffic control apparatus according to the second example embodiment.

<Traffic Control System, Vehicle>

As shown in FIG. 6, a traffic control system 200 according to this example embodiment includes a vehicle 210 and a traffic control center 220c. The vehicle 210 includes a sensor 211 and a vehicle control unit 212. A configuration of the vehicle 210 is the same as that of the vehicle 110 according to the first example embodiment. The control center 220c includes a traffic control apparatus 220.

<Traffic Control Apparatus>

As shown in FIG. 7, the traffic control apparatus 220 is a stand-alone device, and may be incorporated into the traffic control system 200 as shown in FIG. 6. As shown in FIGS. 6 and 7, the traffic control apparatus 220 includes a state specifying unit 221, a state comparison unit 222, a notification unit 223, and a learning device 224. The learning device 224 has a function as learning means.

The learning device 224 is, for example, AI (Artificial Intelligence). The learning device 224 learns a relationship between the peripheral information about the vehicle 210 and the state of the vehicle 210 (at least one of the vehicle-side specified vehicle state and the traffic control-side specified vehicle state). For example, the learning device 224 learns that the video information about an obstacle on the road is related to the state of being stopped in front of an obstacle on the road. Further, the learning device 224 learns that, for example, the video information about a stop sign is related to the state of being stopped in front of a stop sign. Furthermore, the learning device 224 learns that, for example, the video information about another stopped vehicle is related to the state of being stopped in front of another stopped vehicle.

The state specifying unit 221 specifies the state (the traffic control-side specified vehicle state) of the vehicle 210 based on the peripheral information and a result of learning by the learning device 224. For example, the state specifying unit 221 receives video information about an obstacle on the road and peripheral information of the speed 0 [km/h] from the speedometer as the peripheral information. As a result of the learning by the learning device 224, the state specifying unit 221 receives that the video information about the obstacle on the road is related to the state where the vehicle is stopped in front of an obstacle on the road. The state specifying unit 221 specifies the state of the vehicle 210 as "stopped in front of an obstacle on the road" based on the peripheral information and the result of learning by the learning device 224.

The learning device 224 may learn the relationship between the peripheral information about each vehicle 210 received from the vehicle 210 and the state of each vehicle 210 specified by the vehicle 210 based on the peripheral information. In this case, the state specifying unit 221 specifies the state of each vehicle 210 based on the peripheral information about the vehicle 210 and the result of learning by the learning device 224.

The learning device 224 may also learn the relationship between the peripheral information about the vehicle 210 and the state of the vehicle 210 specified by the state specifying unit 221. In this case, the state specifying unit 221 specifies the state of the vehicle 210 based on the peripheral information about the vehicle 210 and the result of learning by the learning device 224.

Next, a traffic control method as an operation of the traffic control system 200 according to the second example embodiment will be described. The description of the traffic control method will be divided into three parts; a description of an operation of the vehicle 210, a description of a traffic control method of the traffic control apparatus 220, and a description of a traffic control method of the traffic control system 200.

<Operation of Vehicle>

Figure 8:
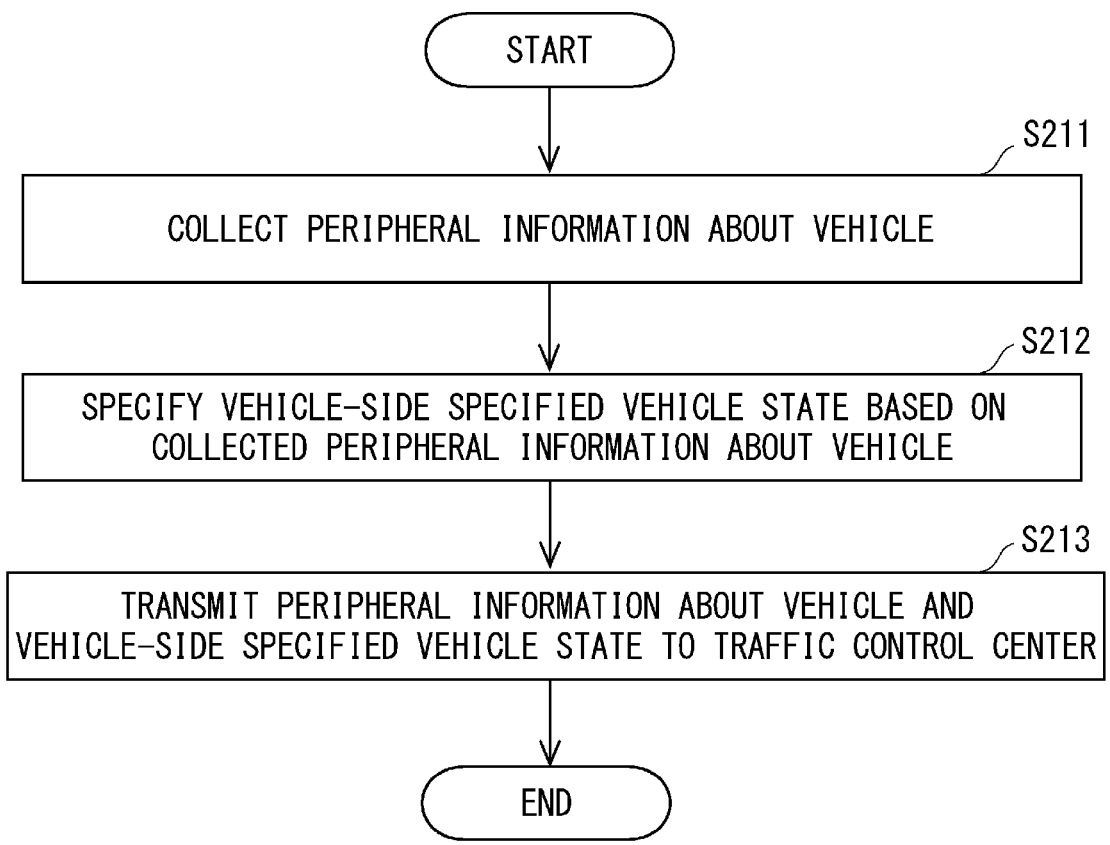
FIG. 8 is a flowchart showing an example of an operation of a vehicle according to the second example embodiment.

FIG. 8 is a flowchart showing an example of the operation of the vehicle 210 according to the second example embodiment. As shown in Step S211 of FIG. 8, the peripheral information about the vehicle 210 is collected. For example, the sensor 211 collects the peripheral information about the vehicle 210. If a plurality of vehicles 210 are present, the operations of the vehicles 210 are the same.

Next, as shown in Step S212, the state of the vehicle 210 (the vehicle-side specified vehicle state) is specified based on the collected peripheral information. Specifically, the vehicle control unit 212 controls the autonomous driving of the vehicle 210 based on the peripheral information output from the sensor 211, and specifies the state of the vehicle 210 (the vehicle-side specified vehicle state).

Next, as shown in Step S213, the collected peripheral information about the vehicle 210 and the specified state of the vehicle 210 (the vehicle-side specified vehicle state) are transmitted to the traffic control center 220c. For example, the sensor 211 transmits the collected peripheral information about the vehicle 210 to the traffic control apparatus 220. The vehicle control unit 212 transmits the specified state of the vehicle 210 (the vehicle-side specified vehicle state) to the traffic control apparatus 220.

<Traffic Control Method of Traffic Control Apparatus>

Figure 9:
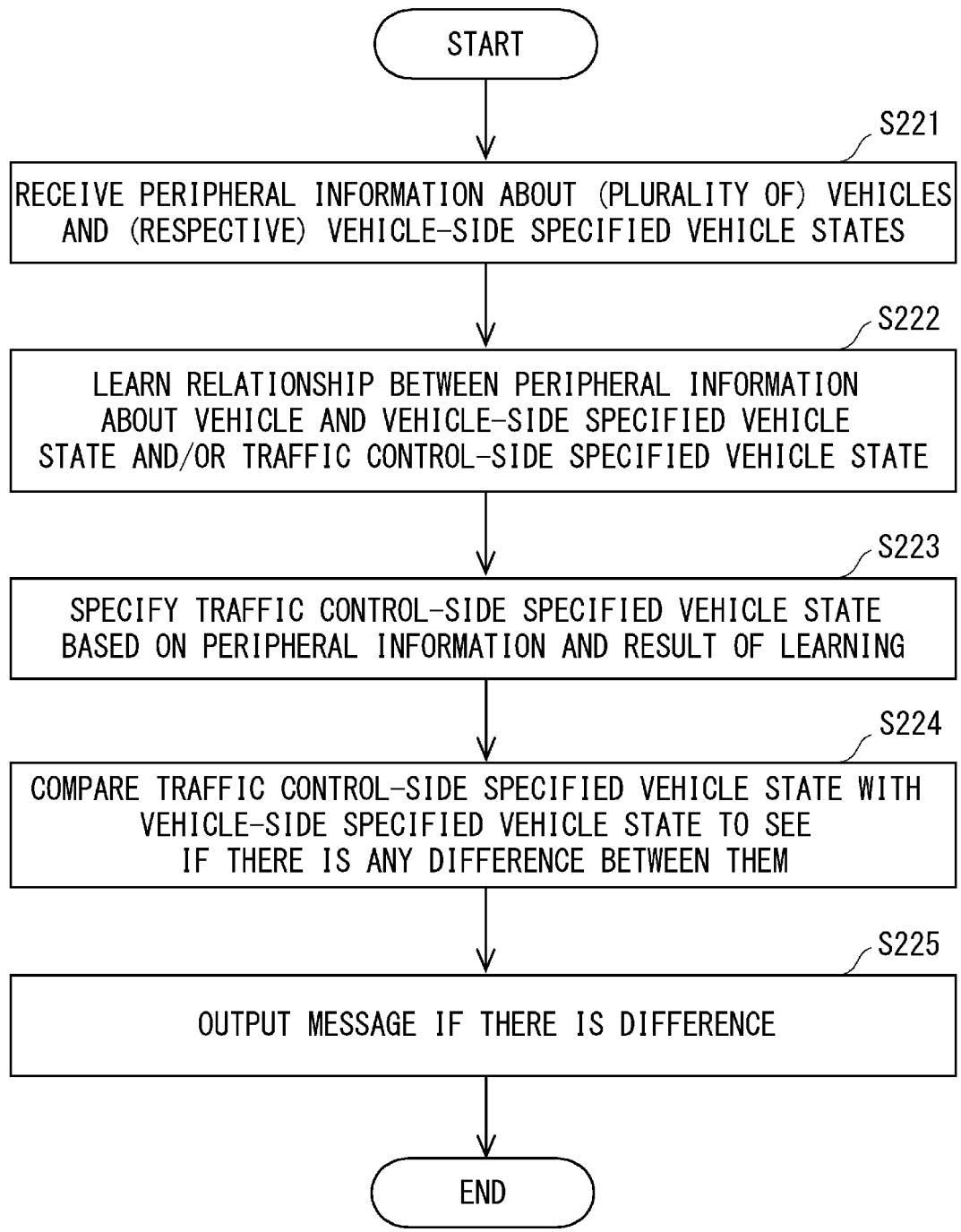
FIG. 9 is a flowchart showing an example of a traffic control method of the traffic control apparatus according to the second example embodiment.

Next, the traffic control method of the traffic control apparatus 220 will be described. FIG. 9 is a flowchart showing an example of the traffic control method of the traffic control apparatus 220 according to the second example embodiment. As shown in Step S221 of FIG. 9, the peripheral information about the vehicle 210 and the state of the vehicle 210 specified by the vehicle 210 (the vehicle-side specified vehicle state) are received. For example, the state specifying unit 221 receives the peripheral information about the vehicle 210 collected by the vehicle 210. The state comparison unit 222 receives the state of the vehicle 210 (the vehicle-side specified vehicle state) specified by the vehicle 210. In this example embodiment, the learning device 224 also receives the peripheral information about the vehicle 210 and the state of the vehicle 210 specified by the vehicle 210 (the vehicle-side specified vehicle state).

When the traffic control apparatus 220 controls a plurality of vehicles 210, the state specifying unit 221 receives each piece of the peripheral information about each vehicle 210 from the vehicle 210. The state comparison unit 222 receives the state of each vehicle 210 (each vehicle-side specified vehicle state) specified by the vehicle 210. The learning device 224 receives the peripheral information about each vehicle 210 received from the vehicle 210 and the state of each vehicle 210 (each vehicle-side specified vehicle state) specified by the vehicle 210 based on the peripheral information.

Next, as shown in Step S222, the learning device 224 learns the relationship between the peripheral information about the vehicle 210 and the state of the vehicle 210 (the vehicle-side specified vehicle state) specified by the vehicle 210. When the plurality of vehicles 210 are present, the learning device 224 learns the relationship between the peripheral information about each vehicle 210 received from the vehicle 210 and the state of each vehicle 210 (each vehicle-side specified vehicle state) specified by the vehicle 210 based on the peripheral information. Note that the learning device 224 may learn the relationship between the peripheral information about the vehicle 210 and the state of the vehicle 210 (the traffic control-side specified vehicle state) specified by the state specifying unit 221. The learning device 224 may also learn the relationship between the peripheral information about the vehicle 210 and both the traffic control-side specified vehicle state and the vehicle-side specified vehicle state. The learning device 224 outputs the result of learning to the state specifying unit 221.

Next, as shown in Step S223, the state specifying unit 221 specifies the state of the vehicle 210 (the traffic control-side specified vehicle state) based on the peripheral information about the vehicle 210 and the result of learning by the learning device 224. When the plurality of vehicles 210 are present, the state specifying unit 221 specifies the state of each vehicle 210 (each traffic control-side specified vehicle state) based on the peripheral information about the vehicle 210 and the result of learning by the learning device.

Next, as shown in Step S224, the state of the specified vehicle 110 (the traffic control-side specified vehicle state) is compared with the vehicle 110 (the vehicle-side specified vehicle state) specified by the vehicle 110 to see if there is a difference between them. The state comparison unit 122 outputs the result of the comparison to the notification unit 223.

Next, as shown in Step S225, when there is a difference, a message indicating the difference is output. For example, when there is a difference between the state of the vehicle 110 specified by the state specifying unit 121 and the state of the vehicle 110 specified by the vehicle 110 in the result of the comparison received from the state comparison unit 122, the notification unit 123 outputs a message indicating the difference to the monitoring person. This enables the monitoring person to take measures such as restarting or remotely controlling the vehicle 110. The message may include the peripheral information.

<Traffic Control Method of Traffic Control System>

Figure 10:
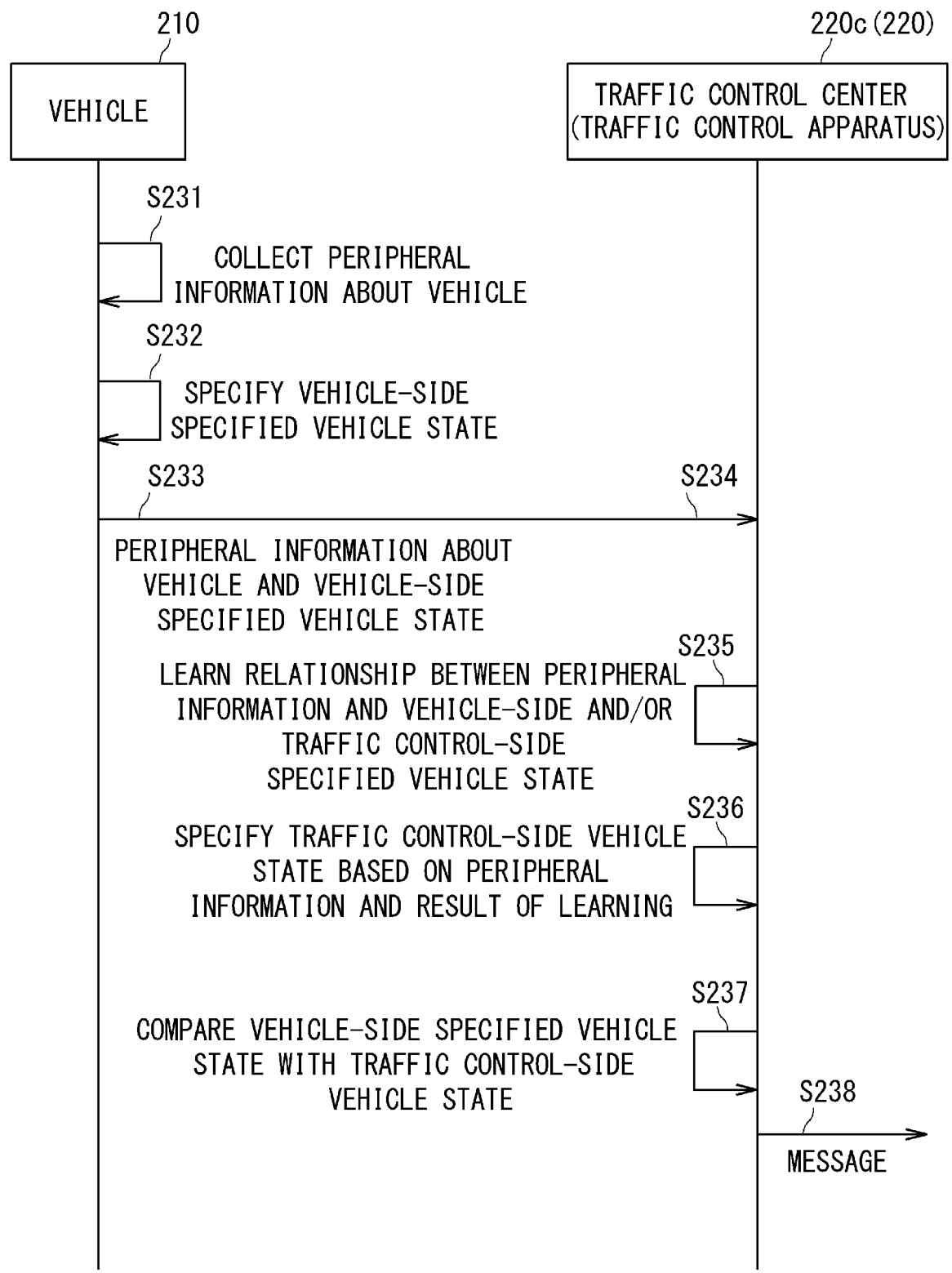
FIG. 10 is a sequence diagram showing an example of the traffic control method of the traffic control system according to the second example embodiment.

Next, the traffic control method of the traffic control system 200 will be described. FIG. 10 is a sequence diagram showing an example of the traffic control method of the traffic control system 200 according to the second example embodiment. As shown in Step S231 of FIG. 10, the vehicle 210 collects the peripheral information about the vehicle 210. For example, the sensor 211 collects the peripheral information about the vehicle 210 that can be autonomously driven.

Next, as shown in Step S232, the vehicle 210 specifies the state of the vehicle 210 based on the collected peripheral information. Specifically, the vehicle control unit 212 controls the autonomous driving of the vehicle 210 based on the peripheral information output from the sensor 211, and specifies the state of the vehicle 210 (the vehicle-side specified vehicle state).

Next, as shown in Step S233, the vehicle 210 transmits the collected peripheral information about the vehicle 210 and the specified state of the vehicle 210 (the vehicle-side specified vehicle state) to the traffic control center 220c. Next, as shown in Step S234, the traffic control apparatus 220 receives the peripheral information about the vehicle 210 and the state of the vehicle 210 specified by the vehicle 210 (the vehicle-side specified vehicle state). When the traffic control apparatus 220 controls a plurality of vehicles 210, the traffic control apparatus 220 receives each piece of the peripheral information about each vehicle 210 and the state of each vehicle 210 (each vehicle-side specified vehicle state) from the vehicle 210.

Next, as shown in Step S235, the traffic control apparatus 220 learns the relationship between the peripheral information about the vehicle 210 and the state of the vehicle 210 (the vehicle-side specified vehicle state) specified by the vehicle 210. When the plurality of vehicles 210 are present, the traffic control apparatus 220 learns the relationship between the peripheral information about each vehicle 210 received from the vehicle 210 and the state of each vehicle 210 (each vehicle-side specified vehicle state) specified by the vehicle 210 based on the peripheral information. Note that the traffic control apparatus 220 may learn the relationship between the peripheral information about the vehicle 210 and the state of the vehicle 210 (the traffic control-side specified vehicle state) specified by the state specifying unit 221. The traffic control apparatus 220 may also learn the relationship between the peripheral information about the vehicle 210 and both the traffic control-side specified vehicle state and the vehicle-side specified vehicle state.

Next, as shown in Step S236, the traffic control apparatus 220 specifies the state of the vehicle 210 based on the peripheral information about the vehicle 210 and the result of learning by the learning device 224. When the plurality of vehicles 210 are present, the state specifying unit 221 specifies the state of each vehicle 210 based on the peripheral information about the vehicle 210 and the result of learning by the learning device.

Next, as shown in Step S237, the state comparison unit 222 of the traffic control apparatus 220 compares the state of the specified vehicle 210 (the traffic control-side specified vehicle state) with the state of the vehicle 210 specified by the vehicle 210 (the vehicle-side specified vehicle state) to see if there is a difference between them. The state comparison unit 222 outputs the result of the comparison to the notification unit 223.

Next, as shown in Step S238, when there is a difference, a message indicating the difference is output. For example, when there is a difference between the state of the vehicle 210 specified by the state specifying unit 221 and the state of the vehicle 210 specified by the vehicle 210 in the result of the comparison received from the state comparison unit 222, the notification unit 223 outputs a message indicating the difference to the monitoring person. This enables the monitoring person to take measures such as restarting or remotely controlling the vehicle 210. The message may include the peripheral information.

Next, the effect of this example embodiment will be described. The traffic control apparatus 220 according to this example embodiment includes the learning device 224. Since the learning device 224 can learn the state of the vehicle 210 (the traffic control-side specified vehicle state) specified by the state specifying unit 221, the accuracy of the state of the vehicle 210 specified by the state specifying unit 221 can be improved.

Further, the learning device 224 learns the relationship between the peripheral information about each vehicle 210 received from the f vehicle 210 and the state of each vehicle 210 specified by the vehicle 210 based on the peripheral information, so that the amount of samples to be learned by the learning device 224 can be increased. Therefore, the accuracy of the learning device 224 can be improved, and the accuracy of the state of the vehicle 210 specified by the state specifying unit 221 can be improved. The configuration, operation, and effects other than those described above in this example embodiment are included in the description of the first example embodiment.

Third Example Embodiment

Figure 11:
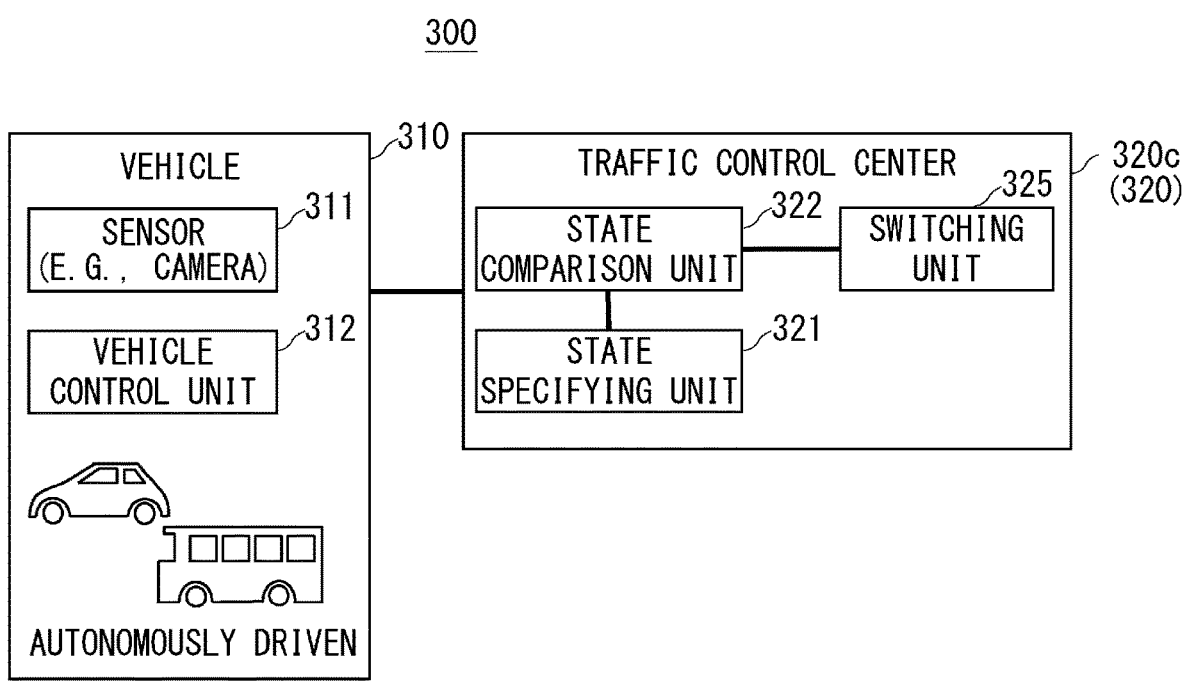
FIG. 11 is a configuration diagram showing an example of a traffic control system according to a third example embodiment.
Figure 12:
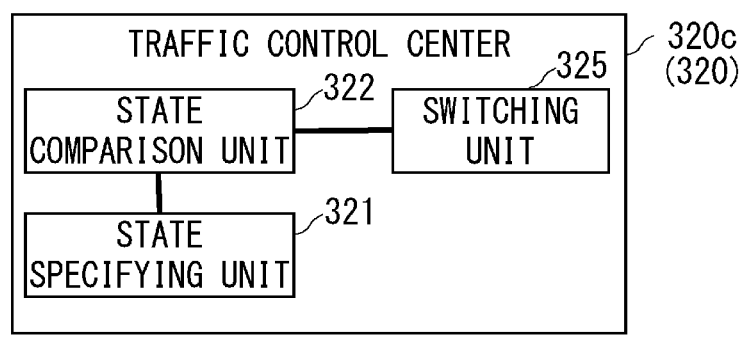
FIG. 12 is a configuration diagram showing an example of a traffic control apparatus according to the third example embodiment.

Next, a traffic control system according to a third example embodiment will be described. In a traffic control system according to this example embodiment, the traffic control apparatus includes a switching unit. FIG. 11 is a configuration diagram showing an example of a traffic control system according to the third example embodiment. FIG. 12 is a configuration diagram showing an example of the traffic control apparatus according to the third example embodiment.

<Traffic Control System, Vehicle>

As shown in FIG. 11, a traffic control system 300 according to this example embodiment includes a vehicle 310 and a traffic control center 320c. The vehicle 310 includes a sensor 311 and a vehicle control unit 312. A configuration of the vehicle 310 is the same as those of the vehicle 110 and the vehicle 210 according to the first and second example embodiments. The control center 320c includes a traffic control apparatus 320.

<Traffic Control Apparatus>

As shown in FIG. 12, the traffic control apparatus 320 is a stand-alone device, and may be incorporated into the traffic control system 300 as shown in FIG. 11. As shown in FIGS. 11 and 12, the traffic control apparatus 320 includes a state specifying unit 321, a state comparison unit 322, and a switching unit 325. The switching unit 325 has a function as switching means.

The switching unit 325 switches the control on the vehicle 310 to remote control when there is a difference between the state of the vehicle 310 specified by the state specifying unit 321 (the traffic control-side specified vehicle state) and the state of the vehicle 310 specified by the vehicle 310 (the vehicle-side specified vehicle state). For example, the switching unit 325 switches the control on the vehicle 310 to allow the monitoring person to remotely control the vehicle 310 via the traffic control apparatus 320.

The traffic control apparatus 320 may further include a notification unit. When the switching unit 325 switches the control on the vehicle 310 to the remote control, the notification unit may notify the monitoring person of the remote control.

Figure 13:
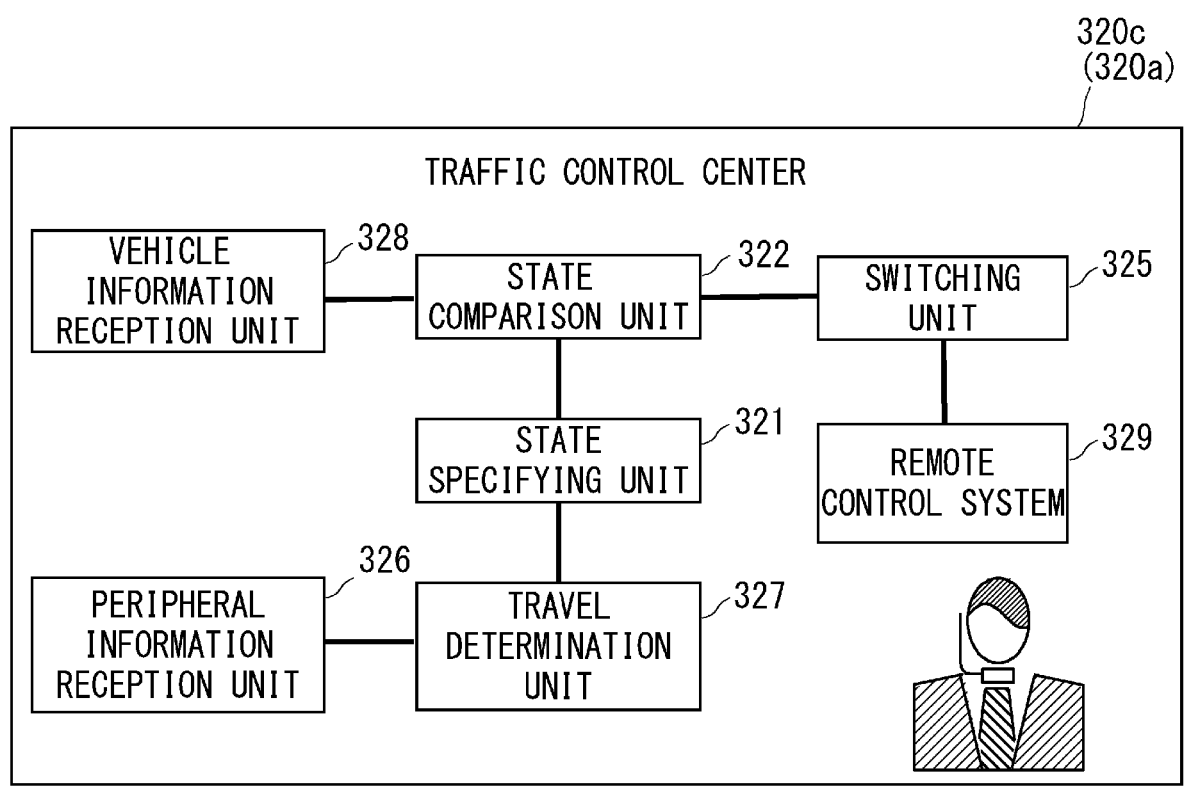
FIG. 13 is a configuration diagram showing an example of the traffic control apparatus according to another example of the third example embodiment.

FIG. 13 is a configuration diagram showing an example of a traffic control apparatus according to another example of the third example embodiment. As shown in FIG. 13, the traffic control center 320c includes a traffic control apparatus 320a. The traffic control apparatus 320a includes, in addition to the state specifying unit 321, the state comparison unit 322, and the switching unit 325, a peripheral information reception unit 326, a travel determination unit 327, a vehicle information reception unit 328, and a remote control system 329. The peripheral information reception unit 326, the travel determination unit 327, and the vehicle information reception unit 328 have functions as peripheral information reception means, travel determining means, and vehicle information reception means, respectively.

The peripheral information reception unit 326 receives the peripheral information from the vehicle 310. The peripheral information reception unit 326 receives, for example, the peripheral information collected by the sensor 311 of the vehicle 310.

The traveling determination unit 327 determines a traveling state about whether the vehicle 310 is traveling or the vehicle 310 is stopped based on the received peripheral information. For example, the traveling determination unit 327 determines the traveling state of the vehicle 310 based on the video information, the speed information, and the like. The traveling determination unit 327 transmits the determined traveling state of the vehicle 310 to the state specifying unit 321 together with the peripheral information. Thus, the state specifying unit 321 specifies the state of the vehicle 310 when the vehicle 310 is traveling separately from its specifying of the state of the vehicle 310 when the vehicle 310 is stopped.

The vehicle information reception unit 328 receives information about the state of the vehicle 310 (the vehicle-side specified vehicle state) specified by the vehicle control unit 312 from the vehicle 310. The vehicle information reception unit 328 transmits the received state of the vehicle 310 to the state comparison unit 322.

The remote control system 329 remotely controls the vehicle 310. For example, the remote control system 329 controls the remote monitoring person to remotely control the vehicle 310 when the switching unit 325 switches the control on the vehicle 310 to remote control.

According to the traffic control system 300 of this example embodiment, when there is a difference between the state of the vehicle 310 specified by the state specifying unit 321 (the traffic control-side specified vehicle state) and the state of the vehicle 310 specified by the vehicle 310 (the vehicle-side specified vehicle state), the switching unit 325 switches the control on the vehicle 310 to remote control. Therefore, for example, when there is false recognition or the like in the vehicle 310, the control can be switched to the remote control. This enables the monitoring person to take measures such as restarting or remotely controlling the vehicle 210.

The state specifying unit 321 specifies the state of the vehicle 310 when the vehicle 310 is traveling separately from its specifying of the state of the vehicle 310 when the vehicle 310 is stopped. Therefore, since the state of the vehicle 310 (the state of the traffic control-side specified vehicle state) can be narrowed down in accordance with the traveling state of the vehicle 310, the state of the vehicle 310 can be specified with high accuracy. Other configurations, operations, and effects in this example embodiment are described in the first and second example embodiments.

Although the first to third example embodiments have been described above, the present disclosure is not limited to the first to third example embodiments and can be suitably modified without departing from the spirit. For example, an example embodiment in which the respective configurations of the first to third example embodiments are combined is included in the scope of the technical concept. A control program for causing a computer to execute the traffic control method according to the first to third example embodiments is also included in the technical range of the first to third example embodiments.

The whole or part of the example embodiments disclosed above can be described as, but not limited to, the following supplementary notes.

Supplementary Note 1

A traffic control apparatus comprising:
state specifying means for specifying a state of a vehicle based on peripheral information about the vehicle received from the vehicle that can be autonomously driven;
state comparison means for comparing a first specified vehicle state with a second specified vehicle state to see whether there is a difference between the first specified vehicle state and the second specified vehicle state, the first specified vehicle state being a state of the vehicle specified by the state specifying means and the second specified vehicle state being the state of the vehicle received from the vehicle and specified by the vehicle based on the peripheral information; and
notification means for outputting a message indicating the difference when there is the difference between the first specified vehicle state and the second specified vehicle state.

Supplementary Note 2

The traffic control apparatus according to Supplementary note 1, further comprising:
a learning device configured to learn a relationship between the peripheral information and at least one of the first specified vehicle state and the second specified vehicle state, wherein
the state specifying means specifies the first specified vehicle state based on the peripheral information and a result of the learning by the learning device.

Supplementary Note 3

The traffic control apparatus according to Supplementary note 2, wherein
the learning device is configured to learn the relationship between each piece of the peripheral information about each vehicle received from each of a plurality of the vehicles and the second specified vehicle state specified by each vehicle based on the peripheral information, and the state specifying means specifies each of the first specified vehicle states based on each piece of the peripheral information and the result of learning by the learning device.

Supplementary Note 4

The traffic control apparatus according to any one of Supplementary notes 1 to 3, wherein
when there is the difference, the message includes the peripheral information.

Supplementary Note 5

The traffic control apparatus according to any one of Supplementary notes 1 to 4, further comprising:
switching means for switching control on the vehicle to remote control when there is the difference.

Supplementary Note 6

The traffic control apparatus according to any one of Supplementary notes 1 to 5, wherein
the difference means that one of the first specified vehicle state and the second specified vehicle state is a travelable state and another one of the first specified vehicle state and the second specified vehicle state is an untravelable state.

Supplementary Note 7

The traffic control apparatus according to any one of Supplementary notes 1 to 6, wherein
the state specifying means specifies the state of the vehicle when the vehicle is traveling separately from its specifying of the state of the vehicle when the vehicle is stopped.

Supplementary Note 8

A traffic control system comprising:
a vehicle that can be autonomously driven; and
a traffic control center configured to control the vehicle, wherein
the vehicle comprises:
  a sensor configured to collect peripheral information about the vehicle; and
  vehicle control means for controlling autonomous driving of the vehicle based on the collected peripheral information and specifying a state of the vehicle, and
the traffic control center comprises:
  state specifying means for specifying the state of the vehicle based on the peripheral information;
  state comparison means for comparing a first specified vehicle state with a second specified vehicle state to see whether there is a difference between the first specified vehicle state and the second specified vehicle state, the first specified vehicle state being the state of the vehicle specified by the state specifying means and the second specified vehicle state being the state of the vehicle specified by the vehicle control means; and
  notification means for outputting a message indicating the difference when there is the difference between the first specified vehicle state and the second specified vehicle state.

Supplementary Note 9

The traffic control system according to Supplementary note 8, wherein
the traffic control center further comprises:
  a learning device configured to learn a relationship between the peripheral information and at least one of the first specified vehicle state and the second specified vehicle state, and
the state specifying means specifies the first specified vehicle state based on the peripheral information and a result of the learning by the learning device.

Supplementary Note 10

The traffic control system according to Supplementary note 9, further comprising:
a plurality of the vehicles, wherein
the learning device is configured to learn a relationship between each piece of the peripheral information about each of the plurality of vehicles received from the each of the vehicles and the second specified vehicle state specified by the each of the vehicles based on the peripheral information, and
the state specifying means specifies the state of the each vehicle based on the peripheral information and the result of learning by the learning device.

Supplementary Note 11

The traffic control system according to any one of Supplementary notes 8 to 10, wherein
when there is the difference, the message includes the peripheral information.

Supplementary Note 12

The traffic control system according to any one of Supplementary notes 8 to 11, further comprising:
a switching unit configured to switch control on the vehicle to remote control when there is the difference.

Supplementary Note 13

The traffic control system according to any one of Supplementary notes 8 to 12, wherein
the difference means that one of the first specified vehicle state and the second specified vehicle state is a travelable state and another one of the first specified vehicle state and the second specified vehicle state is an untravelable state.

Supplementary Note 14

The traffic control system according to any one of Supplementary notes 8 to 13, wherein
the state specifying means specifies the first specified vehicle state when the vehicle is traveling separately from its specifying of the state of the vehicle when the vehicle is stopped.

Supplementary Note 15

A traffic control method comprising:
receiving peripheral information about a vehicle from the vehicle that can be autonomously driven and a state of the vehicle specified by the vehicle based on the peripheral information;
specifying a first specified vehicle state based on the received peripheral information, the first specified vehicle state being the state of the vehicle;
comparing the specified first specified vehicle state with a second specified vehicle state to see whether there is a difference between the first specified vehicle state and the second specified vehicle state, the second specified vehicle state being the state of the vehicle specified by the vehicle; and
outputting a message indicating the difference when there is the difference between the first specified vehicle state and the second specified vehicle state.

Supplementary Note 16

The traffic control method according to Supplementary note 15, further comprising:
learning a relationship between the peripheral information and at least one of the first specified vehicle state and the second specified vehicle state, wherein
when the state of the vehicle is specified, the state of the vehicle is specified based on the peripheral information and a result of the learning.

Supplementary Note 17

The traffic control method according to Supplementary note 16, wherein
when the relationship between the peripheral information and at least one of the first specified vehicle state and the second specified vehicle state is learned, the relationship between each piece of the peripheral information about each of a plurality of the vehicles received from the each vehicle and the second specified vehicle state specified by the each vehicle based on the peripheral information is learned, and
when the first specified vehicle state is specified, each of the first specified vehicle states is specified based on the each piece of the peripheral information and the result of learning.

Supplementary Note 18

The traffic control method according to any one of Supplementary notes 15 to 17, wherein
when there is the difference, the message includes the peripheral information.

Supplementary Note 19

The traffic control method according to any one of Supplementary notes 15 to 18, wherein
control on the vehicle is switched to remote control when there is the difference.

Supplementary Note 20

The traffic control method according to any one of Supplementary notes 15 to 19, wherein
the difference means that one of the first specified vehicle state and the second specified vehicle state is a travelable state and another one of the first specified vehicle state and the second specified vehicle state is an untravelable state.

Supplementary Note 21

The traffic control method according to any one of Supplementary notes 15 to 20, wherein
when the first specified vehicle state is specified, the state of the vehicle is specified when the vehicle is traveling separately from the specifying of the first specified vehicle state when the vehicle is stopped.

Supplementary Note 22

A non-transitory computer readable medium storing a traffic control program for causing a computer to execute:
receiving peripheral information about a vehicle from the vehicle that can be autonomously driven and a state of the vehicle specified by the vehicle based on the peripheral information;
specifying a first specified vehicle state based on the received peripheral information, the first specified vehicle state being the state of the vehicle;
comparing the specified first specified vehicle state with a second specified vehicle state to see whether there is a difference between the first specified vehicle state and the second specified vehicle state, the second specified vehicle state being the state of the vehicle specified by the vehicle; and
outputting a message indicating the difference when there is the difference between the first specified vehicle state and the second specified vehicle state.

Supplementary Note 23

A non-transitory computer readable medium storing the traffic control program according to Supplementary note 22, further causing the computer to execute:
learning a relationship between the peripheral information and at least one of the first specified vehicle state and the second specified vehicle state, wherein
when the state of the vehicle is specified, the state of the vehicle is specified based on the peripheral information and a result of the learning.

Supplementary Note 24

A non-transitory computer readable medium storing the traffic control program according to Supplementary note 23, further causing the computer to execute:
when the relationship between the peripheral information and at least one of the first specified vehicle state and the second specified vehicle state is learned, the program further causes the computer to execute learning the relationship between each piece of the peripheral information about each of a plurality of the vehicles received from the each vehicle and the second specified vehicle state specified by the each vehicle based on the peripheral information, and
when the first specified vehicle state is specified, each of the first specified vehicle states is specified based on the each piece of the peripheral information and the result of learning.

Supplementary Note 25

A non-transitory computer readable medium storing the traffic control program according to any one of Supplementary notes 23 to 24, wherein
when there is the difference, the message includes the peripheral information.

Supplementary Note 26

A non-transitory computer readable medium storing the traffic control program according to any one of Supplementary notes 23 to 25, wherein
control on the vehicle is switched to remote control when there is the difference.

Supplementary Note 27

A non-transitory computer readable medium storing the traffic control program according to any one of Supplementary notes 23 to 26, wherein
the difference means that one of the first specified vehicle state and the second specified vehicle state is a travelable state and another one of the first specified vehicle state and the second specified vehicle state is an untravelable state.

Supplementary Note 28

A non-transitory computer readable medium storing the traffic control program according to any one of Supplementary notes 23 to 27, wherein
when the first specified vehicle state is specified, the state of the vehicle is specified when the vehicle is traveling separately from the specifying of the first specified vehicle state when the vehicle is stopped.

In the above example, the above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W (Read Only Memory), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Reference Signs List

| | |
|---|---|
| 100, 200, 300 | TRAFFIC CONTROL SYSTEM |
| 110, 210, 310 | VEHICLE |
| 111, 211, 311 | SENSOR |
| 112, 212, 312 | VEHICLE CONTROL UNIT |
| 120, 220, 320, 320a | TRAFFIC CONTROL APPARATUS |
| 120c, 220c, 320c | TRAFFIC CONTROL CENTER |
| 121, 221, 321 | STATE SPECIFYING UNIT |
| 122, 222, 322 | STATE COMPARISON UNIT |
| 123, 223 | NOTIFICATION UNIT |

-continued

Reference Signs List

| | |
|---|---|
| 224 | LEARNING DEVICE |
| 325 | SWITCHING UNIT |
| 326 | PERIPHERAL INFORMATION RECEPTION UNIT |
| 327 | TRAVEL DETERMINATION UNIT |
| 328 | VEHICLE INFORMATION RECEPTION UNIT |
| 329 | REMOTE CONTROL SYSTEM |

What is claimed is:

1. A traffic control apparatus provided in a traffic control center with an interface that operates a plurality of vehicles, the traffic control apparatus comprising:
at least one memory storing instructions, and
at least one processor configured to execute the instructions to:
specify a state of a vehicle based on a signal indicating peripheral information about the vehicle received from the vehicle that can be autonomously driven;
compare a first specified vehicle state with a second specified vehicle state to see whether there is a difference between the first specified vehicle state and the second specified vehicle state, the first specified vehicle state being a state of a first vehicle specified by the processor based on a first signal indicating a first peripheral information about the first vehicle received from the first vehicle and the second specified vehicle state being the state of the first vehicle received from the first vehicle and specified by the first vehicle based on the first signal indicating the first peripheral information; and
output a second signal related a message indicating the difference to the interface in a case that there is the difference between the first specified vehicle state and the second specified vehicle state,
wherein in a case that the difference is a predetermined difference, the processor executes the instructions to enable the interface to remotely control the first vehicle, and
wherein the interface is remote from the first vehicle,
wherein a state specifying unit, of the traffic control unit and implemented by the at least one processor, and a vehicle control unit, of the vehicle and implemented by a second processor of the vehicle, are both configured to specify the state of the vehicle, and the state specifying unit is less likely than the vehicle control unit to output a false recognition of the state,
wherein the at least one processor is further configured to execute the instructions to:
specify the state of the vehicle in a case that the vehicle is both stopped and is determined to be traveling differently from the second specified vehicle state determined by the vehicle control unit; and
in a case that the difference indicates that one of the first specified vehicle state and the second specified vehicle state is a travelable state and another one of the first specified vehicle state and the second specified vehicle state is an untravelable state in a case that the vehicle is stopped, restart the vehicle.

2. The traffic control apparatus according to claim 1, further comprising:
a learning device configured to learn a relationship between the peripheral information and at least one of the first specified vehicle state and the second specified vehicle state, wherein the processor executes the instruction to specify the first specified vehicle state based on the peripheral information and a result of the learning by the learning device.

3. The traffic control apparatus according to claim 2, wherein
the learning device is configured to learn the relationship between each piece of the peripheral information about each vehicle received from each of a plurality of the vehicles and the second specified vehicle state specified by each vehicle based on the peripheral information, and
the processor executes the instruction to specify each of the first specified vehicle states based on each piece of the peripheral information and the result of learning by the learning device.

4. The traffic control apparatus according to claim 1, wherein
in a case that there is the difference, the message includes the peripheral information.

5. The traffic control apparatus according to claim 1, the processor executes the instruction to switch control on the vehicle to remote control in a case that there is the difference.

6. The traffic control apparatus according to claim 1, wherein remotely controlling the first vehicle comprises any of starting and stopping motion of the first vehicle.

7. A traffic control system comprising:
a vehicle that can be autonomously driven; and
a traffic control center configured to control the vehicle, wherein
the vehicle comprises:
a sensor configured to collect peripheral information about the vehicle; and
vehicle control unit configured to control autonomous driving of the vehicle based on the collected peripheral information and specifying a state of the vehicle, and
the traffic control center including a traffic control apparatus with an interface that operates a plurality of vehicles, the traffic control center comprises:
state specifying unit configured to specify the state of the vehicle based on a signal indicating the peripheral information;
state comparison unit configured to compare a first specified vehicle state with a second specified vehicle state to see whether there is a difference between the first specified vehicle state and the second specified vehicle state, the first specified vehicle state being the state of a first vehicle specified by the state specifying unit based on a first signal indicating a first peripheral information about the first vehicle received from the first vehicle and the second specified vehicle state being the state of the first vehicle specified by the first vehicle control unit; and
notification unit configured to output a second signal related a message indicating the difference to the interface in a case that there is the difference between the first specified vehicle state and the second specified vehicle state,
wherein in a case that the difference is a predetermined difference, the traffic control center enables the interface to remotely control the first vehicle, and
wherein the interface is remote from the first vehicle,
wherein the state specifying unit, the state comparison unit, and the notification unit of the traffic control unit are implemented by a processor, the vehicle control unit of the vehicle is implemented by a second processor, and the state specifying unit and the vehicle control unit are both configured to specify the state of the vehicle, and the state specifying unit is less likely than the vehicle control unit to output a false recognition of the state,
wherein the processor is further configured to execute the instructions to:
specify the state of the vehicle in a case that the vehicle is both stopped and is determined to be traveling differently from the second specified vehicle state determined by the vehicle control unit; and
in a case that the difference indicates that one of the first specified vehicle state and the second specified vehicle state is a travelable state and another one of the first specified vehicle state and the second specified vehicle state is an untravelable state in a case that the vehicle is stopped, restart the vehicle.

8. The traffic control system according to claim 7, wherein the traffic control center further comprises:
a learning device configured to learn a relationship between the peripheral information and at least one of the first specified vehicle state and the second specified vehicle state, and
the state specifying unit specifies the first specified vehicle state based on the peripheral information and a result of the learning by the learning device.

9. The traffic control system according to claim 8, further comprising:
a plurality of the vehicles, wherein
the learning device is configured to learn a relationship between each piece of the peripheral information about each of the plurality of vehicles received from the each of the vehicles and the second specified vehicle state specified by the each of the vehicles based on the peripheral information, and
the state specifying unit specifies the state of the each vehicle based on the each piece of the peripheral information and the result of learning by the learning device.

10. The traffic control system according to claim 7, wherein
in a case that there is the difference, the message includes the peripheral information.

11. The traffic control system according to claim 7, wherein
the traffic control center further comprises:
a switching unit configured to switch control on the vehicle to remote control in a case that there is the difference.

12. A traffic control method comprising:
receiving a first signal indicating a first peripheral information about a first vehicle from the first vehicle that can be autonomously driven and a second state of the first vehicle specified by the first vehicle based on the first peripheral information;
specifying a first specified vehicle state based on the first signal indicating the received first peripheral information, the first specified vehicle state being the state of the first vehicle;
comparing the specified first specified vehicle state with the second specified vehicle state to see whether there is a difference between the first specified vehicle state and the second specified vehicle state, the second specified vehicle state being the state of the first vehicle specified by the first vehicle, the first specified vehicle state is specified by a state specifying unit of a traffic control unit remote from the first vehicle and implemented by a processor, and the second specified vehicle state is specified by a second processor of the first vehicle;

outputting a second signal related a message indicating the difference to an interface that operates a plurality of vehicles from a traffic control center, when there is the difference between the first specified vehicle state and the second specified vehicle state; and in a case that the difference is a predetermined difference, remotely controlling the first vehicle by the interface, and wherein the interface is remote from the first vehicle, wherein the state specifying unit and the vehicle control unit are both configured to specify the state of the vehicle, and the state specifying unit is less likely than the vehicle control unit to output a false recognition of the state, wherein the method further comprises:
- specifying the state of the vehicle in a case that the vehicle is both stopped and is determined to be traveling differently from the second specified vehicle state determined by the vehicle control unit; and
- in a case that the difference indicates that one of the first specified vehicle state and the second specified vehicle state is a travelable state and another one of the first specified vehicle state and the second specified vehicle state is an untravelable state in a case that the vehicle is stopped, restarting the vehicle.

13. The traffic control method according to claim 12, further comprising:
learning a relationship between the peripheral information and at least one of the first specified vehicle state and the second specified vehicle state, wherein in a case that the state of the vehicle is specified, the state of the vehicle is specified based on the peripheral information and a result of the learning.

14. The traffic control method according to claim 13, wherein in a case that the relationship between the peripheral information and at least one of the first specified vehicle state and the second specified vehicle state is learned, the relationship between each piece of the peripheral information about each of a plurality of the vehicles received from the each vehicle and the second specified vehicle state specified by the each vehicle based on the peripheral information, and in a case that the first specified vehicle state is specified, each of the first specified vehicle states is specified based on the each piece of the peripheral information and the result of learning.

15. The traffic control method according to claim 12, wherein in a case that there is the difference, the message includes the peripheral information.

16. The traffic control method according to claim 12, wherein control on the vehicle is switched to remote control in a case that there is the difference.

* * * * *